(12) United States Patent
Hamamoto et al.

(10) Patent No.: US 12,021,260 B2
(45) Date of Patent: *Jun. 25, 2024

(54) ELECTRICALLY CONDUCTIVE HYBRID MEMBRANE, MAKING METHOD THEREOF, SECONDARY BATTERY AND ELECTRONIC DEVICE COMPRISING THE SAME

(71) Applicant: SAMSUNG ELECTRONICS CO., LTD., Suwon-si (KR)

(72) Inventors: Nobuo Hamamoto, Suwon-si (KR); Shintaro Kitajima, Hwaseong-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/986,462

(22) Filed: Nov. 14, 2022

(65) Prior Publication Data
US 2023/0092959 A1    Mar. 23, 2023

Related U.S. Application Data

(63) Continuation of application No. 16/734,549, filed on Jan. 6, 2020, now Pat. No. 11,581,613.

(30) Foreign Application Priority Data

Jan. 21, 2019  (KR) .................. 10-2019-0007795

(51) Int. Cl.
| | | |
|---|---|---|
| H01M 50/446 | (2021.01) | |
| H01M 10/0525 | (2010.01) | |
| H01M 4/02 | (2006.01) | |

(52) U.S. Cl.
CPC ..... *H01M 50/446* (2021.01); *H01M 10/0525* (2013.01); *H01M 2004/027* (2013.01); *H01M 2004/028* (2013.01)

(58) Field of Classification Search
None
See application file for complete search history.

(56) References Cited

U.S. PATENT DOCUMENTS

| | | | |
|---|---|---|---|
| 4,183,988 A | 1/1980 | Farrington et al. | |
| 4,247,499 A | 1/1981 | Glugla et al. | |
| 4,977,007 A | 12/1990 | Kondo et al. | |
| 6,372,387 B1 | 4/2002 | Kawakami et al. | |
| 7,820,022 B2 | 10/2010 | McNulty et al. | |
| 9,502,729 B2 | 11/2016 | Badding et al. | |
| 11,581,613 B2* | 2/2023 | Hamamoto | H01M 10/054 |
| 2005/0180117 A1* | 8/2005 | Tetsuka | H01L 24/81 |
| | | | 257/E21.511 |
| 2006/0280912 A1 | 12/2006 | Liang et al. | |
| 2008/0092946 A1* | 4/2008 | Munteanu | H10K 30/151 |
| | | | 136/252 |
| 2008/0218671 A1* | 9/2008 | Nakamura | G02B 5/3083 |
| | | | 428/212 |
| 2010/0198521 A1* | 8/2010 | Haick | G01N 27/4146 |
| | | | 706/14 |
| 2014/0061057 A1* | 3/2014 | Ardo | C25B 1/55 |
| | | | 204/252 |
| 2014/0301903 A1 | 10/2014 | Wang | |
| 2015/0005406 A1* | 1/2015 | Ooga | C08G 18/283 |
| | | | 522/39 |
| 2015/0079485 A1 | 3/2015 | Choi et al. | |
| 2015/0255767 A1* | 9/2015 | Aetukuri | H01M 10/056 |
| | | | 429/247 |
| 2016/0118651 A1* | 4/2016 | Kovalev | H01M 4/628 |
| | | | 156/60 |
| 2016/0181585 A1 | 6/2016 | Choi et al. | |
| 2017/0179466 A1 | 6/2017 | Tiwari | |
| 2017/0301903 A1 | 10/2017 | Choi et al. | |
| 2018/0340305 A1* | 11/2018 | Ragsdale, Jr. | E02D 17/18 |

FOREIGN PATENT DOCUMENTS

| | | | |
|---|---|---|---|
| CN | 107452925 A | | 12/2017 |
| CN | 109074894 A | | 12/2018 |
| JP | 2003-043495 | * | 2/2003 |
| JP | 2003064324 A | | 3/2003 |
| JP | 2006206843 A | | 8/2006 |
| JP | 2017216066 A | | 12/2017 |
| JP | 2018006297 A | | 1/2018 |
| KR | 20120077909 A | | 7/2012 |
| KR | 1020160075292 A | | 6/2016 |
| WO | 2015132681 A1 | | 9/2015 |

OTHER PUBLICATIONS

Machine translation of JP 2003-043495, published on Feb. 13, 2003 (Year: 2003).*
Chinese Office Action for Chinese Patent Application No. 202010017024.3 dated Nov. 29, 2022.
"Anisotropic Conductive Film (ACF) for Film On Glass for large FPDs" Dexeriaals, Retrieved from Internet dated Dec. 23, 2019 https://www.dexerials.jp/en/products/a7/cp10000.html.
Aetukuri et al., "Flexible ion-Conducting Composite Membranes from Lithium Batteries", Adavanced Energy Materials, 2015, p. 1-6.
Kiesow et al. "Bicontinuous Zeolite polymer Composite Membranes Prepared via Float Casting", JACS, American Chemical Society, 2013, 135 4380-4388.
Kitajima et al., "Fabrication and impedance analysis for designed composite layers with polymer and inorganic electrolytes leading to high conductivity", Solid State Ionics, 316, 2018, 29-33.
Office Action dated Aug. 30, 2023 of the corresponding application (Korean Patent Application No. 10-2019-0007795).

* cited by examiner

*Primary Examiner* — Anca Eoff
(74) *Attorney, Agent, or Firm* — CANTOR COLBURN LLP

(57) ABSTRACT

An electrically conductive hybrid membrane, including a solid membrane substrate including a curable material; and electrically conductive particle disposed on the solid membrane substrate, wherein the solid membrane substrate has an elastic modulus of about 10 MPa to about 1000 MPa, and the electrically conductive particle is exposed on both sides of the solid membrane substrate.

19 Claims, 12 Drawing Sheets

ELECTRICALLY CONDUCTIVE HYBRID MEMBRANE, MAKING METHOD THEREOF, SECONDARY BATTERY AND ELECTRONIC DEVICE COMPRISING THE SAME

CROSS-REFERENCE TO RELATED APPLICATION

This application is a Continuation of U.S. patent application Ser. No. 16/734,549, filed on Jan. 6, 2020, and claims priority to and the benefit of Korean Patent Application No. 10-2019-0007795 filed in the Korean Intellectual Property Office on Jan. 21, 2019, and all the benefits accruing therefrom under 35 U.S.C. § 119, the entire contents of which are incorporated herein by reference.

BACKGROUND

1. Field

An electrically conductive hybrid membrane, a making method thereof, and a secondary battery and an electronic device including the same are disclosed.

2. Description of the Related Art

According to the growing desire for a secondary battery providing a high-capacity and a high power, a variety of secondary batteries such as a lithium battery (LiB) has been researched. An all-solid-state battery and a secondary battery including metal-oxygen, or metal-air may have a higher theoretical specific energy 3 to 5 times of that of a lithium ion battery, due to the atomic density of a low atomic number element, such as lithium or the like.

In a positive electrode of the battery as above, a metal atom (e.g., lithium atom) is oxidized to form an ion (e.g., lithium ion) and an electron, and the produced ion is moved to a negative electrode by an electrolyte, so as to be reacted with gas.

An electrically conductive hybrid membrane passing the ion but not permeating moisture or the like may be disposed between the electrolyte and the positive electrode. The electrically conductive hybrid membrane may block the exchange of other materials except ions between the positive electrode and the negative electrode, thus it may prevent that other materials are transported to a positive electrode and/or a negative electrode to occur a side reaction.

An anisotropic conductive film is widely used as a connection material between a liquid crystal panel and an organic light emitting diodes (OLED) panel, and a driver IC in an electronic device such as a liquid crystal display and an organic light emitting display. The anisotropic conductive film is electrically insulated from adjacent components, and functions to electrically connect the connected panel to the driver IC.

It is desirable for the membrane having electrical conductivity (ion and/or electron conductivity) to have high conductivity for ions and/or electrons, workability for being processed to have a large area, mechanical flexibility, and a barrier property for reactive material such as water, oxygen, or carbon dioxide.

SUMMARY

An electrically conductive hybrid membrane having improved workability, flexibility, and barrier properties is provided.

In addition, a method of making the electrically conductive hybrid membrane by a simple method is provided.

A secondary battery capable of reducing a side reaction between an ion conductive membrane, and an electrode, and an electronic device capable of connecting internal constituent elements by including the electrically conductive hybrid membrane are provided.

An electrically conductive hybrid membrane includes: a solid membrane substrate including a curable material; and an electrically conductive particle disposed on the solid membrane substrate, wherein the solid membrane substrate has an elastic modulus of about 10 megaPascals (MPa) to about 1000 MPa, and the electrically conductive particle is exposed on both sides of the solid membrane substrate.

The solid membrane substrate may have an insulating property.

The curable material may include one or more of a thermosetting material, an ultraviolet (UV) curable material, and a moisture curable material.

The curable material may have tackiness.

The conductive particles may be arranged in hexagonal shape.

The curable material may include an acryl-based compound, an epoxy-based compound, a urethane-based compound, a phenol-based compound, or a combination thereof.

A thickness of the solid membrane substrate may be less than or equal to a diameter of the conductive particles.

The conductive particles may include ion conductive particles, electron conductive particles, or a combination thereof.

The ion conductive particles may conduct at least one ion of a lithium ion, a sodium ion, a proton, a potassium ion, an iron ion, a zinc ion, a magnesium ion, and a potassium ion.

The ion conductive particle may have an ion conductivity of about $1 \times 10^{-5}$ S/cm to about $1 \times 10^{-3}$ S/cm.

The ion conductive particle may include at least one of $ZrO_2$, $AlO_3$, and a compound represented by Chemical Formula 1 to Chemical Formula 4.

$$Li_3La_{(2/3-x)}TiO_3 \quad \text{Chemical Formula 1}$$

$$Li_yLa_3M^1_2O_{12} \quad \text{Chemical Formula 2}$$

$$Li_{(2+2z)}Zn_{(1-z)}GeO_4 \quad \text{Chemical Formula 3}$$

$$Li_wM^2_2(PO_4)_3 \quad \text{Chemical Formula 4}$$

In Chemical Formula 1 to Chemical Formula 4, $M^1$ is at least one element of zirconium (Zr), niobium (Nb), tantalum (Ta), antimony (Sb), and bismuth (Bi), $M^2$ is at least one element of Aluminum (Al), germanium (Ge), titanium (Ti), hafnium (Hf), and zirconium (Zr), $0 \leq w \leq 2, 0 \leq x \leq 2/3, 5 \leq y \leq 7$, and $0 \leq z < 1$.

The electron conductive particle may include an elastomer and a metal layer disposed on the surface of the elastomer.

The elastomer may include a polystyrene-based compound, an epoxy-based compound, a polyimide-based compound, a phenol-based compound, or a combination thereof.

The metal layer may include gold (Au), silver (Ag), nickel (Ni), palladium (Pd), copper (Cu), or a combination thereof.

The metal layer may include two or more layers, and the two or more layers may include different metals.

A method of making the electrically conductive hybrid membrane includes: disposing the electrically conductive particle on the membrane substrate-forming layer, pressing the membrane substrate-forming layer and the electrically conductive particle, and curing the membrane substrate-forming layer to make the electrically conductive hybrid membrane.

The pressing may be performed at a temperature higher than room temperature.

The pressing may be performed at a pressure of about 1 MPa to about 100 MPa and at a temperature of about 50° C. to about 300° C.

Before the curing, the elastic modulus of the pressed membrane substrate-forming layer may be less than or equal to about 100 kPa.

Before the pressing, a peel strength of the membrane substrate-forming layer may be greater than or equal to about 0.05 N/25 mm.

The curing may include at least one of an ultraviolet (UV) curing process, a heat curing process, and a moisture curing process.

When a thickness of the membrane substrate-forming layer before disposing of the electrically conductive particles is referred to as t and a diameter of the conductive particles is referred to as D, t and D may satisfy the relationship of Equation 1.

$$t \leq 0.4 \times D \qquad \text{Equation 1}$$

A secondary battery according includes a positive electrode; and a negative electrode; and the electrically conductive hybrid membrane disposed between the positive electrode and the negative electrode.

An electronic device includes the electrically conductive hybrid membrane.

The electrically conductive hybrid membrane may have improved workability, flexibility, ion conductivity, and barrier properties. Also, since the electrically conductive hybrid membrane may be made by a relatively simple method, mass productivity of the electrically conductive hybrid membrane may be provided.

The secondary battery including the electrically conductive hybrid membrane may have improved ion conductivity, and a side reaction of the electrode is reduced, which may lead to improved efficiency and cycle-life.

An electronic device including the electrically conductive hybrid membrane may have improved electrical conductivity between the connected panel and the driver integrated circuit (IC).

BRIEF DESCRIPTION OF THE DRAWINGS

The above and other advantages and features of this disclosure will become more apparent by describing in further detail exemplary embodiments thereof with reference to the accompanying drawings, in which.

DETAILED DESCRIPTION

Figure 1:
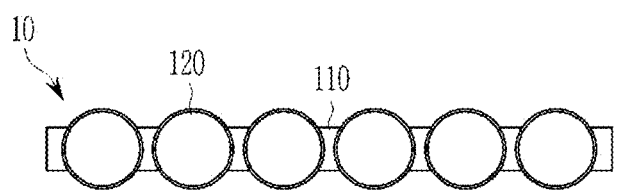
FIG. 1 is a schematic view illustrating an exemplary embodiment of an electrically conductive hybrid membrane.

Example embodiments of the present disclosure will hereinafter be described in detail, and may be easily performed by a person having an ordinary skill in the related art. However, this disclosure may be embodied in many different forms, and is not to be construed as limited to the example embodiments set forth herein.

In the drawings, the thickness of layers, films, panels, regions, etc., are exaggerated for clarity. Like reference numerals designate like elements throughout the specification. It will be understood that when an element such as a layer, film, region, or substrate is referred to as being "on" another element, it can be directly on the other element or intervening elements may also be present. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

As used herein, for a particle diameter of a particle in the present disclosure, although it may be numerized by a measurement to show an average size of a group, the generally used method includes a mode diameter showing the maximum value of the distribution, a median diameter corresponding to the center value of integral distribution curve, a variety of average diameters (numeral average, length average, area average, mass average, volume average), and the like. Unless particularly mentioning otherwise, an average particle diameter, or a particle diameter, means a number average diameter in the present disclosure, and it is obtained by measuring D50 (particle diameter at a position of distribution rate of 50%).

As used herein, electrical conductivity means a property in which a carrier having a charge moves so that a current flows between two contacted constituent elements. Examples of the carrier include an electron and an ion.

In the secondary battery and/or the electronic device, an electrically conductive membrane for selectively conducting only a selected carrier (e.g., an ion such as a lithium ion or an electron) desirably provides suitable workability so it can be processed into a large area, has suitable mechanical flexibility, high conductivity for the carrier, and barrier properties to a reactive material such as water, oxygen, carbon dioxide and the like.

However, there is no current material satisfying all the properties among the available materials used for the electrically conductive membrane. The available materials may include an organic gel, organic polymer, inorganic non-oxide, ceramic glass, and the like.

For example, the organic gel has a weak mechanical strength and is vulnerable to gas and does not provide suitable electrical conductivity. The organic polymer seems to have excellent mechanical strength and flexibility and also has excellent barrier properties to gas, but does not provide suitable electrical conductivity. The inorganic non-oxide seems to have excellent electrical conductivity but does not provide suitable barrier properties since it has hygroscopicity and is reactive with oxygen or the like. The ceramic glass has excellent electrical conductivity but has low mechanical strength and flexibility due to its brittleness, and it is difficult to be produced in a large area unless increasing the thickness.

As a substitute of the available materials, an organic/inorganic or organic/inorganic/metal hybrid electrically conductive membrane has been suggested. The organic/inorganic hybrid electrically conductive membrane provides thermal stability and electrical conductivity through an inorganic or inorganic/metal hybrid electrically conductive material and provides workability, flexibility, and other mechanical properties through an organic polymer.

However, the organic/inorganic or organic/inorganic/metal hybrid electrically conductive membrane applies a wet process. Thus, it is difficult to ensure a mass production, since carrying out processes, such as etching the remaining organic polymer region and removing the same after coating the organic polymer, can be difficult.

In order to improve this, it may be suggested that the inorganic or inorganic/metal hybrid electrically conductive material is disposed and the organic polymer is coated under a vacuum, and a grid is disposed during the drying process, but the organic polymer may be insufficiently permeated under the grid, and it may cover the electrically conductive material. Thus, it is difficult to control the entire process conditions, therefore, it is not suitable for the mass production.

Also, another improving way may be considered that the conductive material is disposed on a thermoplastic organic polymer, and the both surfaces thereof are pressed, but the thermoplastic organic polymer is too flexible to be peeled off after the pressing, and the inside and/or surface defects of the membrane may occur.

Accordingly, there is increasing need for an electrically conductive hybrid membrane having excellent workability, flexibility, and barrier properties and capable of being produced by the simple method to provide a mass productivity.

An embodiment may provide electrically conductive hybrid membrane having mass productivity since it is simply produced without complicated process conditions comparing to an alternative process, and also having all of workability, flexibility, and barrier properties, and a method of making the same.

Hereinafter, a structure of an electrically conductive hybrid membrane according to an embodiment is further described.

FIG. 1 is a schematic view of an electrically conductive hybrid membrane according to an embodiment.

Referring to FIG. 1, an electrically conductive hybrid membrane 10 according to an embodiment includes a solid membrane substrate 110 including a curable material and conductive particles 120 disposed on the solid membrane substrate 110.

In an embodiment, the conductive particles 120 may be respectively exposed from both sides of the solid membrane substrate 110. In other words, the conductive particles 120 may be respectively exposed from both opposing surfaces (referring to FIG. 1, upper and lower surfaces of membrane substrate) of the solid membrane substrate 110.

An ion conductive membrane of the electrically conductive hybrid membrane is disposed between a positive electrode and a negative electrode of a secondary battery and the opposing surfaces are disposed facing to each of the positive electrode and the negative electrode. Accordingly, in order that the ion conductive membrane between the positive electrode and the negative electrode blocks moisture and selectively passes only an ion (for example, a lithium ion, etc.), regions having an ion conductivity are preferably exposed from both sides of the ion conductive membrane.

In an alternative embodiment, with the electron conductive layer between the electrically conductive hybrid membranes, two constituent elements in the electronic device, for example, the panel and the driver integrated circuit (IC) are configured to be connected to each other. In this embodiment, the electron conductive layer physically/electrically connects regions where the panel and the driving IC are each contacted, but other regions contacting the other electron conductive layers or the relationships with the adjacent constituent elements are preferred to be electrically insulated.

But in the electrically conductive hybrid membrane 10 according to an embodiment, the conductive particles 120 are each exposed on the both sides of the solid membrane substrate 110, thereby the electrically conductive hybrid membrane 10 according to an embodiment may selectively pass only ions and/or electrons.

According to an embodiment, the solid membrane substrate 110 may maintain an arrangement of the conductive particles 120 in the relationship with the conductive particles 120. In this embodiment, the solid membrane substrate 110 may have insulating properties, and may have a resistivity of 10 ohm-meters ($\Omega \cdot m$) to $10^{25}$ $\Omega \cdot m$, e.g., $10^3$ $\Omega \cdot m$ to $10^{20}$ $\Omega \cdot m$. Thereby, the ion and/or electron exchange may be blocked by the region where the solid membrane substrate 110 is formed, but ion and/or electron may be passed through the electrically conductive particles 120.

The solid membrane substrate 110 may have an electrical insulation property, so as to prevent passing ions and/or electrons in other regions except the conductive particles 120. In addition, the solid membrane substrate 110 may have barrier properties to gases such as moisture, oxygen, carbon dioxide, and the like.

In an embodiment, the solid membrane substrate 110 may include the curable material. In this embodiment, the curable material is a main component for the solid membrane substrate 110. Thereby, the solid membrane substrate 110 may strongly maintain the solid phase through the curing process.

In an exemplary device, the solid membrane substrate 110 may be formed with the curable material, but, optionally, may further include the various known organic/inorganic materials such as a polymerization initiator or the like while including the curable material as the main component.

In an alternative exemplary device, the curable material may provide the solid membrane substrate 110 with an appropriate level of flexibility and also decreased possibility of defects (voids, cracks, etc.) on the membrane itself, compared to the thermoplastic material.

According to an embodiment, the curable material may include any suitable material having a solid phase through the curing process, and the curing method is not particularly limited. In an exemplary device, the curable material may be at least any one of a thermosetting material, an ultraviolet (UV) curable material, and a moisture curable material. In an embodiment, the curable material may include at least two materials having different curable properties of the thermosetting, ultraviolet (UV) curable, moisture curable properties.

Specific examples of the curable material may be an acryl-based compound, an epoxy-based compound, a urethane-based compound, a phenol-based compound, or a combination thereof.

For example, the curable material may be the acryl-based compound.

Non-limiting examples of the acryl-based compound may include at least one type of the various cross-linking groups inside thereof in addition to an acryl group. Examples of the cross-linking group may include an isocyanate group, a diisocyanate group, a maleimide group, and the like.

In an exemplary embodiment, the curable material may have a predetermined elasticity. The elasticity may be selected depending upon a temperature, and the elastic modulus at a room temperature (25° C.) of the solid membrane substrate 110, in which the curable material is completely cured to a solid phase, may be, for example, greater than or equal to about 10 MPa, greater than or equal to about 20 MPa, greater than or equal to about 30 MPa, greater than or equal to about 40 MPa, greater than or equal to about 50 MPa, or greater than or equal to about 60 MPa, and for example, less than or equal to about 1000 MPa, less than or equal to about 900 MPa, less than or equal to about 800 MPa, less than or equal to about 700 MPa, less than or equal to about 600 MPa, less than or equal to about 500 MPa, less than or equal to about 400 MPa, less than or equal to about 300 MPa, less than or equal to about 200 MPa, or less than or equal to about 100 MPa, or for example, about 10 MPa to about 1000 MPa, about 20 MPa to about 1000 MPa, about 30 MPa to about 1000 MPa, about 30 MPa to about 900 MPa, about 40 MPa to about 800 MPa, about 40 MPa to about 700 MPa, about 40 MPa to about 600 MPa, about 40 MPa to about 500 MPa, about 40 MPa to about 400 MPa, about 50 MPa to about 300 MPa, or about 50 MPa to about 200 MPa. When the elastic modulus after curing the curable material satisfies the range, the solid membrane substrate 110 may have the appropriate level of elasticity and flexibility.

In an exemplary embodiment, the elastic modulus before curing the curable material may be selected depending upon a temperature. In an exemplary device, the curable material may have an elastic modulus at a room temperature (25° C.) of, for example, less than or equal to about 200 kPa, less than or equal to about 190 kPa, less than or equal to about 180 kPa, less than or equal to about 170 kPa, or less than or equal to about 160 kPa, and may have an elastic modulus of, at a temperature range slightly higher than the room temperature, for example, about 50° C. to about 200° C., for example, about 1 kPa to about 100 kPa, or about 5 kPa to about 90 kPa. When the elastic modulus before curing the curable material satisfies the range, the conductive particles 120 which will be further described later may be easily disposed in the membrane substrate-forming layer.

In an exemplary embodiment, the curable material may have an adhesion or tack. When the curable material further has adhesion, the conductive particles 120, which will be further described later, may be disposed in the membrane substrate-forming layer including the curable material to have a predetermined arrangement. The specific arrangement of the conductive particles 120 will be further described later. The electrically conductive hybrid membrane may have a tackiness of about 1 Newton per square centimeter ($N/cm^2$) to about 20 $N/cm^2$, when determined according to ASTM D 3121-94 at 30° C.

In an alternative exemplary embodiment, in order that the conductive particles 120 are exposed each of the both surfaces of the solid membrane substrate 110, the thickness of the solid membrane substrate 110 is preferred to be at least less than or equal to a diameter of the conductive particles 120.

In an exemplary device, the solid membrane substrate 110 may have a thickness which is less than or equal to about 90%, less than or equal to about 80%, less than or equal to about 70%, less than or equal to about 60%, less than or equal to about 50%, less than or equal to about 40% of the diameter of the conductive particles 120 and a thickness which is at least greater than or equal to about 20%, for example, greater than or equal to about 30%. When the solid membrane substrate 110 satisfies the range, the electrically conductive hybrid membrane 10 may show excellent electrical conductivity, mechanical strength and barrier properties.

In an embodiment, the conductive particles 120 may transfer ions and/or electrons onto the both surfaces of the electrically conductive hybrid membrane 10 as mentioned above. According to this embodiment, the conductive particles 120 are exposed on the both surfaces of the solid membrane substrate 110 to provide an electrical conductivity, so that the conductive particles 120 may be formed in a monolayer.

Figure 2:
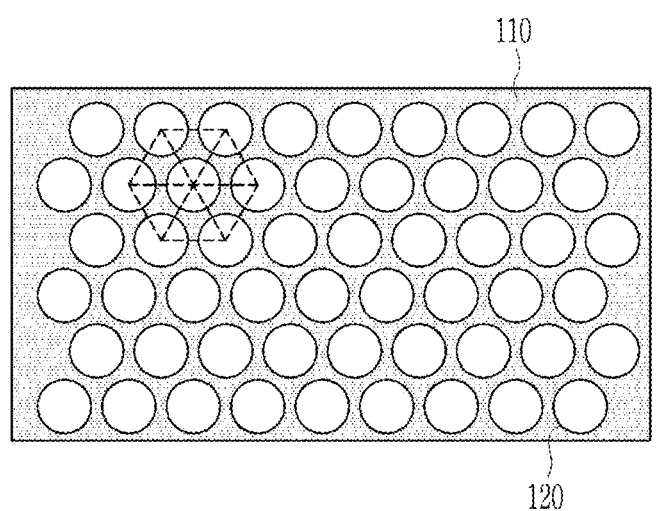
FIG. 2 is a top plan view of an electrically conductive hybrid membrane according to an exemplary embodiment, viewed from either side of both sides of the membrane.

FIG. 2 is a top plane view, viewed from either side of both sides of the electrically conductive hybrid membrane according to an embodiment.

Referring to FIG. 2, the conductive particles 120 may be disposed in the solid membrane substrate 110 to provide a predetermined arrangement. In an exemplary device, the conductive particles 120 may be arranged in a hexagonal form.

According to an embodiment, the predetermined arrangement may be an arrangement that the conductive particles 120 are densely disposed. In an exemplary device, the conductive particles 120 may be arranged in a hexagonal close-packed form. In this case, the volume of conductive particles 120 per a unit volume is increased, so the area where conductive particles 120 are exposed on the both sides of the electrically conductive hybrid membrane 10 is also increased. Resultantly, it may provide an electrically conductive hybrid membrane 10 with the improved electrical conductivity.

However, the specific disposition or arrangement of the conductive particles 120 is not limited thereto, and the arrangement or disposition may be varied depending upon a kind of the conductive particles 120, an application field of the electrically conductive hybrid membrane 10, a material of the curable material for the solid membrane substrate 110, and the adhesion strength (or peel strength), and the like, under the conditions that the conductive particles 120 are exposed on each the both sides of the solid membrane substrate 110.

In an embodiment, the conductive particles 120 may include ion conductive particles, electron conductive particles, or a combination thereof. In this embodiment, when the conductive particles 120 include ion conductive particles, the electrically conductive hybrid membrane 10 may show ion conductivity; or when including the electron conductive particles, the electrically conductive hybrid membrane 10 may show electron conductivity.

When the electrically conductive hybrid membrane 10 shows ion conductivity, the conductive particles 120 may conduct at least one ion of, for example, lithium ion, sodium ion, proton, potassium ion, iron ion, zinc ion, magnesium ion, and potassium ion.

In an embodiment, the conductive particles 120 may show an ion conductivity to the ions of, at least, greater than or equal to about $10^{-6}$ S/cm, for example, greater than or equal to about $10^{-5}$ S/cm, and, for example, less than or equal to about $1\times10^{-3}$ S/cm or less than or equal to about $1\times10^{-4}$ S/cm, or it may show an ion conductivity of, for example, about $1\times10^{-5}$ S/cm to about $1\times10^{-3}$ S/cm, or about $1\times10^{-4}$ S/cm. In this embodiment, the ranged ion conductivity may be an ion conductivity to lithium ions. However, the embodiment is not limited thereto, but it may show excellent ion conductivity within the range to the above-mentioned kind of ions.

In an alternative embodiment, the conductive particles 120 may include a sulfide, an oxide, or a combination thereof.

In an alternative embodiment, the sulfide broadly refers to a material formed by compounding sulfur atom with metal, oxygen, hydrocarbon, and the like.

In an alternative embodiment, the oxide broadly refers to a material formed by compounding oxygen atom with metal, hydrocarbon, etc. In an embodiment, examples of the oxide may be $ZrO_2$, $AlO_3$, and compounds represented by Chemical Formula 1 to Chemical Formula 4. That is, the conductive particles 120 according to an embodiment may include at least one of $ZrO_2$, $AlO_3$, and compounds represented by Chemical Formula 1 to Chemical Formula 4.

$$Li_3La_{(2/3-x)}TiO_3 \quad \text{Chemical Formula 1}$$

$$Li_yLa_3M^1{}_2O_{12} \quad \text{Chemical Formula 2}$$

$$Li_{(2+2z)}Zn_{(1-z)}GeO_4 \quad \text{Chemical Formula 3}$$

$$Li_wM^2{}_2(PO_4)_3 \quad \text{Chemical Formula 4}$$

In Chemical Formula 1 to Chemical Formula 4, $M^1$ is at least one element selected from zirconium (Zr), niobium (Nb), tantalum (Ta), antimony (Sb), and bismuth (Bi), $M^2$ is at least one element selected from Aluminum (Al), germanium (Ge), titanium (Ti), hafnium (Hf), and zirconium (Zr), $$0 \leq w \leq 2, \ 0 \leq x \leq 2/3, \ 5 \leq y \leq 7, \text{ and}$$

$$0 \leq z < 1.$$

The conductive particles 120 may use only any one of the compounds represented by Chemical Formulae 1 to 4 or may use a mixture of at least two of them, depending upon the kind of ion to be conducted.

In an exemplary embodiment, when the electrically conductive hybrid membrane 10 shows the electron conductivity, the conductive particles 120 may include, for example, an elastomer and a metal layer formed on the surface of the elastomer. In an exemplary device, the conductive particles 120 may have a core-shell structure that a metal shell layer is formed on a surface of a core made of elastomer.

The elastomer is not particularly limited as long as the material has the predetermined elasticity, but may include, for example, a polystyrene-based compound, an epoxy-based compound, a polyimide-based compound, a phenol-based compound, or a combination thereof.

The metal layer formed on the surface of the elastomer provides the predetermined electrical conductivity to the conductive particles 120. The metal layer may be a monolayer or a multilayer of at least two layers.

In an exemplary device, the metal included in the metal layer may include, for example, gold (Au), silver (Ag), nickel (Ni), palladium (Pd), copper (Cu), or a combination thereof. The metal may be a single metal or an alloy of at least two of the metals.

In an exemplary embodiment, when the metal layer is a multilayer of at least two layers, the at least two layers may include different metals from each other.

In an exemplary device, the conductive particles 120 may be one that a nickel layer and a gold layer are sequentially formed on a surface of an elastomer including an epoxy-based compound and a phenol-based compound.

However, an embodiment is not limited thereto, but the kind of the metal, the number of the layers, and the like may be altered in various manners according to the electrical conductivity required for the conductive particles 120.

A thickness of the electrically conductive hybrid membrane 10 according to an embodiment may be selected depending upon a thickness of the solid membrane substrate 110 and a diameter and/or a material of the conductive particles 120, and the like, but the thickness may be, for example, greater than or equal to about 5 μm, greater than or equal to about 10 μm, greater than or equal to about 15 μm, greater than or equal to about 20 μm and, for example, less than or equal to about 50 μm, less than or equal to about 45 μm, less than or equal to about 40 μm, less than or equal to about 35 μm, less than or equal to about 30 μm, or less than or equal to about 25 μm, or for example, about 5 μm to about 50 μm, or about 20 μm to about 50 μm.

When the electrically conductive hybrid membrane 10 according to an embodiment has a thickness within the range, the flexibility and the workability may be maintained as well as improved mechanical strength and barrier properties provided.

As described above, the electrically conductive hybrid membrane 10 according to an embodiment may pass ions and/or electrons through the conductive particles 120 exposed onto the both sides of the membrane and may block transferring the remaining materials such as moisture, oxygen, carbon dioxide, and the like. In addition, the electrically conductive hybrid membrane 10 according to an embodiment may ensure the excellent mechanical strength and flexibility and barrier properties by defining a relationship of between a thickness of the solid membrane substrate 110 and a diameter of the conductive particles 120 and may also show the excellent electrical conductivity caused by the conductive particles 120.

Hereinafter, a method of making an electrically conductive hybrid membrane according to an embodiment is described.

Figure 3:
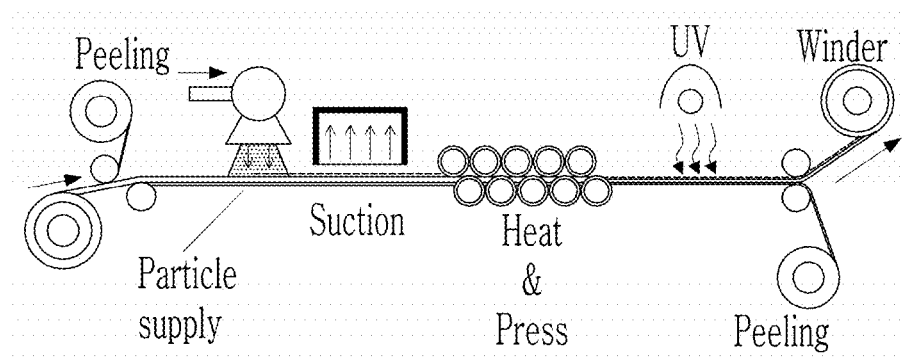
FIG. 3 is a flow diagram of a process of making an electrically conductive hybrid membrane according to an exemplary embodiment.

FIG. 3 is a flow diagram for explaining a process for an electrically conductive hybrid membrane according to an embodiment.

A method of making an electrically conductive hybrid membrane according to an embodiment includes disposing the conductive particles on the membrane substrate-forming layer, pressing the membrane substrate-forming layer and the conductive particles, and curing the membrane substrate-forming layer.

A method of making the electrically conductive hybrid membrane may be sequentially performed from the left to the right in FIG. 3.

The method of making the electrically conductive hybrid membrane may include a continuous process through a conveying part and a roll. In this case, the lower side of the membrane substrate-forming layer may be supported by the lower release substrate. The lower release substrate is not particularly limited as long as it may be continuously transferred or spirally wound as in the process shown in FIG. 3, and may be a polymer substrate such as poly(ethylene terephthalate) (PET) and/or silicon-treated PET, and the like.

In an exemplary method, the conductive particles are disposed to have a predetermined arrangement on the preliminarily prepared membrane substrate-forming layer during disposing the conductive particles.

First, an upper release substrate covered on the upper side of the membrane substrate-forming layer is peeled off. The upper release substrate may include any substrate without particular limitations as long as it may be continuously transferred or spirally wound as in the lower release substrate, and may include a polymer substrate such as PET and/or silicon-treated PET, and the like. Second, conductive particles are supplied onto the membrane substrate-forming layer of which the upper side is exposed. The conductive particles may be scattered, for example, on the upper side of the membrane substrate-forming layer. In the process of scattering the conductive particles, the conductive particles may be disposed to have the predetermined arrangement as mentioned above.

According to an embodiment, the membrane substrate-forming layer may have an adhesion. In an exemplary device, the peel strength of the membrane substrate-forming layer during disposing the conductive particles before the pressing is not particularly limited, but may be at least greater than or equal to about 0.05 N/25 mm, greater than or equal to about 0.5 N/25 mm, greater than or equal to about 1 N/25 mm, greater than or equal to about 2 N/25 mm, greater than or equal to about 3 N/25 mm, greater than or equal to about 4 N/25 mm, or greater than or equal to about 5 N/25 mm, e.g., about 0.05 Newtons (N) per 25 millimeters (mm) to 100 N/25 mm. When the peel strength of the membrane substrate-forming layer satisfies the range, the arranged conductive particles are not deviated from the first arranged position but stayed.

In an exemplary embodiment, the membrane substrate-forming layer is disposed with the conductive particles 120, so the thickness thereof may be thicker than the initial thickness as much as the volume of the disposed conductive particles according to Archimedes principle. Accordingly, in an embodiment, the initial thickness of the membrane substrate-forming layer may be preliminarily prepared in a predetermined thickness considering this point.

Specifically, when t refers to a thickness of the membrane substrate-forming layer before disposing the conductive particles 120, D refers to a diameter of the conductive particles 120, the t and the D may satisfy a relationship of Equation 1.

$$t \leq 0.4 \times D \qquad \text{Equation 1}$$

Equation 1 may be obtained through the following calculations.

Figure 4:
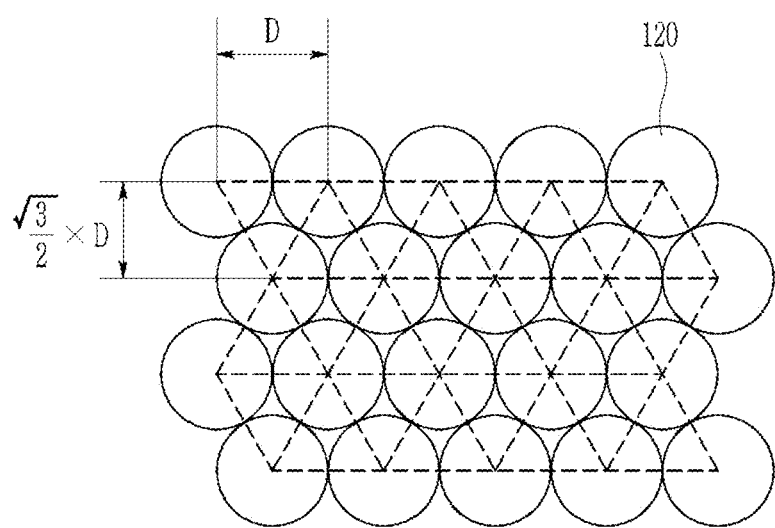
FIG. 4 is a schematic view showing electron conductive particles disposed to have the densest structure in the membrane substrate-forming layer.

FIG. 4 is a schematic view showing the case where the electron conductive particles are disposed to have the densest structure in the membrane substrate-forming layer.

First, it is supposed that conductive particles 120, which are ideally spherical particles having a diameter D, are arranged in an ideal hexagonal close-packed form shown in FIG. 4 in the membrane substrate-forming layer. In this case, a distance connecting centers of the adjacent two conductive particles is referred to as D, and a height of a triangle connecting centers of the adjacent three conductive particles is $$\frac{\sqrt{3}}{2} \times D.$$

When the conductive particles are arranged in N crosses and M columns, the volume of the spherical shape particles is represented by Equation A.

$$[N \times M] \times \left[\left(\frac{\pi}{6}\right) \times D^3\right] \quad \text{Equation A}$$

Meanwhile, the volume of the membrane substrate-forming layer after arranging the conductive particles is represented by Equation B.

$$[N \times D] \times \left[M \times \left(\frac{\sqrt{3}}{2}\right) \times D\right] \times D = [N \times M] \times \left[\left(\frac{\sqrt{3}}{2}\right) \times D^3\right] \quad \text{Equation B}$$

However, when t' refers to a thickness of the membrane substrate-forming layer after arranging the conductive particles while t refers to an initial thickness of the membrane substrate-forming layer, a relationship of the t/t' satisfies Equation C.

$$t/t' = \left\{[N \times M] \times \left[\left(\frac{\sqrt{3}}{2}\right) \times D^3\right] - [N \times M] \times \left[\left(\frac{\pi}{6}\right) \times D^3\right]\right\} / \quad \text{Equation C}$$

$$[N \times M] \times \left[\left(\frac{\sqrt{3}}{2}\right) \times D^3\right]$$

$$= \left\{\left[\left(\frac{\sqrt{3}}{2}\right) - \left(\frac{\pi}{6}\right)\right]\right\} \left(\frac{\sqrt{3}}{2}\right) = [1 - \{\pi/\{3 \times ((3^{\wedge}0.5)\}\}] \approx 0.4$$

However, the thickness t' of the membrane substrate-forming layer after arranging the conductive particles may not be greater than the diameter D of the conductive particles, and thus in Equation C, t' is substituted with D, and then Equation 1 may be provided after rearrangement of t and D.

Subsequently, the upper releasing film which was peeled off is coated again on the membrane substrate-forming layer arranged with the conductive particles, and then residual conductive particles which are not arranged in the membrane substrate-forming layer are sucked using suction and removed. But the suction may be omitted depending upon the scattering degree of the conductive particles.

Figure 5:
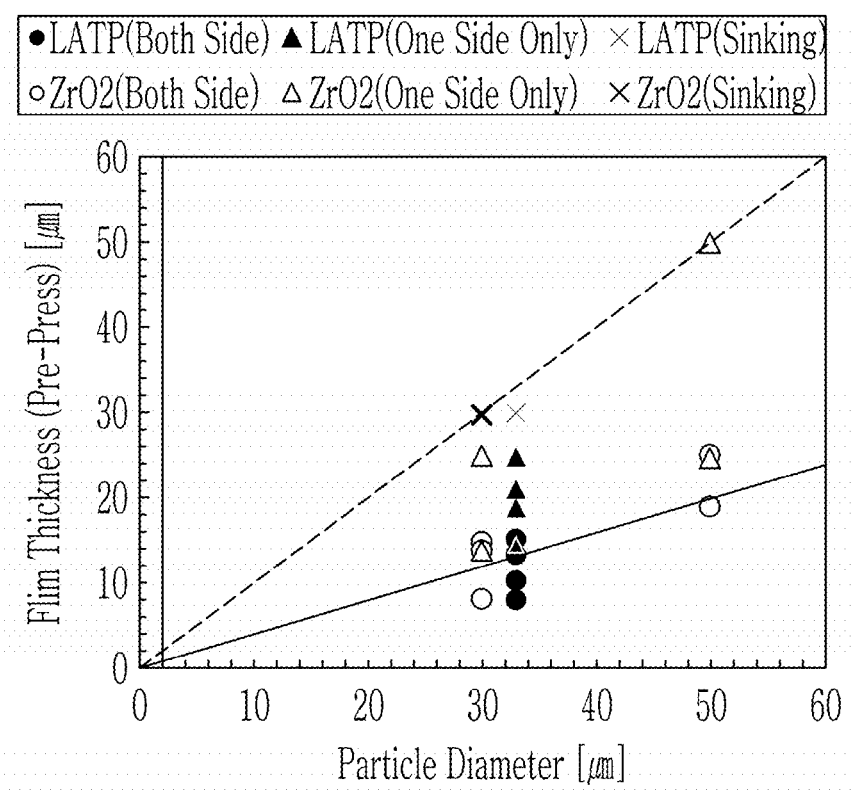
FIG. 5 is a graph of film thickness (micrometers, μm) versus particle diameter (micrometers, μm) showing the surface exposure of electron conductive particles in an electrically conductive hybrid membrane according to an embodiment, together with a relationship of an electron conductive particle diameter and the thickness of the membrane substrate-forming layer before pressing.

FIG. 5 is a graph showing the surface exposure of electron conductive particles in an electrically conductive hybrid membrane according to an embodiment, together with a relationship of the diameter of the electron conductive particles—the thickness of the membrane substrate-forming layer before pressing.

In FIG. 5, $Li_{1.3}Al_{0.3}Ti_{1.7}(PO_4)_3$ ("LATP") particles and $ZrO_2$ particles are used as the electron conductive particles, and an isocyanate group-containing acryl-based adhesive is used as a curable material, and the pressing and heating time conditions are each about 60 MPa, about 150° C., and about 3 minutes, and the curing condition (ultraviolet (UV) irradiating intensity) is about 500 milliJoules per square centimeter ($mJ/cm^2$).

Referring to FIG. 5, it is confirmed that the conductive particles are sunk in the solid membrane substrate, or only either one side (one side only) is exposed when not satisfying Equation 1. In addition, the time point when the both sides of the electrically conductive hybrid membrane are exposed (both side) is slightly different depending upon the kind of the conductive particles, but commonly it is confirmed that the conductive particles are stably exposed onto the both sides of the solid membrane substrate from the case of satisfying Equation 1.

Subsequently, the both sides of the membrane substrate-forming layer in which the conductive particles are arranged are pressed using a pressing means.

In an embodiment, the pressing may be performed at a temperature higher than the room temperature. Specifically, when the membrane substrate-forming layer arranged with the conductive particles is pressed and compacted, the membrane substrate-forming layer may be heated. In an exemplary device, an optional thermal conductive metal plate (e.g., aluminum plate) is disposed on the both sides of the membrane substrate-forming layer arranged with the thermal electrically conductive particles, and then may be pressed together with a heating press or the like and simultaneously, may be heated at a predetermined temperature.

In an exemplary embodiment with a material having a relatively high elastic modulus, the conductive particles are not exposed to each of the upper side and the lower side by only the simple pressing, and any one side (particularly, lower side) may be covered by the solid membrane substrate. But according to another exemplary embodiment, by simultaneously pressing and heating the membrane substrate-forming layer arranged with the conductive particles, an elastic modulus of the membrane substrate-forming layer is slightly lowered to expose the conductive particles onto the both sides.

The elastic modulus of the pressed and heated membrane substrate-forming layer may be changed depending upon the kind of the included curable material and the like, but it may show, for example, less than or equal to about 100 kPa or less than or equal to about 90 kPa at a temperature of about 60° C. to about 250° C. This elastic modulus range is of a very low value with respect to the elastic modulus range of the solid membrane substrate 110.

According to an embodiment, the pressing may be performed, for example, at least greater than or equal to about 1 MPa, greater than or equal to about 5 MPa, greater than or equal to about 10 MPa, greater than or equal to about 20 MPa, greater than or equal to about 30 MPa and may performed, for example, less than or equal to about 100 MPa, less than or equal to about 90 MPa, less than or equal to about 80 MPa, or less than or equal to about 70 MPa, or for example, may be performed at a pressure of about 1 MPa to about 100 MPa, about 5 MPa to about 100 MPa, about 10 MPa to about 100 MPa, or about 20 MPa to about 100 MPa.

When the pressing pressure during the pressing process is less than about 1 MPa, the conductive particles 120 may be not exposed to each of the upper and lower surfaces and may be unfavorably covered by the solid membrane substrate 110; but when is greater than about 100 MPa, the conductive particles 120 is worried to be damaged.

The heating may be performed at a temperature of at least greater than or equal to a room temperature (25° C.), for example, greater than or equal to about 50° C., greater than or equal to about 60° C., greater than or equal to about 70° C., or greater than or equal to about 80° C. and performed at, for example, less than or equal to about 300° C., less than or equal to about 250° C., or less than or equal to about 200° C., or may be performed at, for example, about 50° C. to about 300° C., about 50° C. to about 250° C., about 60° C. to about 250° C., about 70° C. to about 250° C., about 80° C. to about 250° C., or about 80° C. to about 200° C.

In addition, the heating may be performed for, for example, greater than or equal to about 10 seconds, greater than or equal to about 15 seconds, greater than or equal to about 20 seconds, greater than or equal to about 30 seconds, or greater than or equal to about 1 minute and may performed for, for example, less than or equal to about 10 minutes, less than or equal to about 9 minutes, less than or equal to about 8 minutes, or less than or equal to about 7 minutes, or may be performed for, for example, about 15 seconds to about 10 minutes, about 30 seconds to about 10 minutes, about 1 minute to about 10 minutes, about 1 minute to about 9 minutes, about 1 minute to about 8 minutes, or about 1 minute to about 7 minutes.

When the heating temperature and/or time are insufficient, it may be difficult to lower the elastic modulus of the membrane substrate-forming layer as much as the conductive particles 120 are inserted, so the conductive particles 120 may not be exposed on each of the upper side and the lower side of the membrane as it may be covered with the solid membrane substrate 110; but if the heating temperature is too much, the membrane substrate-forming layer and/or the conductive particles 120 may be damaged.

When the pressing and heating are completed, the pressed membrane substrate-forming layer is cured using a curing means. The curing means includes an ultraviolet (UV) curing means, a thermal curing means, a moisture curing means, or a combination thereof, and may include at least one kind of the curing means according to the curable property of the curable material included in the membrane substrate-forming layer.

Subsequently, when the curing is completed, the upper release substrate and the lower release substrate are each peeled off to provide an electrically conductive hybrid membrane 10 according to an embodiment. The order of peeling the upper release substrate and the lower release substrate is not limited in an embodiment, and they may be simultaneously peeled off.

In an exemplary embodiment, the obtained electrically conductive hybrid membrane 10 has excellent mechanical strength and flexibility, so it may be spirally wound using a spiral-wound roll after peeling off the upper/lower release substrates.

As described above, the method of making an electrically conductive hybrid membrane according to an embodiment does not require to satisfy atmosphere conditions such as vacuum, so it is easy to control the overall process conditions compared to a wet process, and also the electrically conductive hybrid membrane may be fabricated through the continuous process, so the mass productivity is also excellent.

Hereinafter, a secondary battery including the electrically conductive hybrid membrane according to an embodiment is described.

Figure 6:
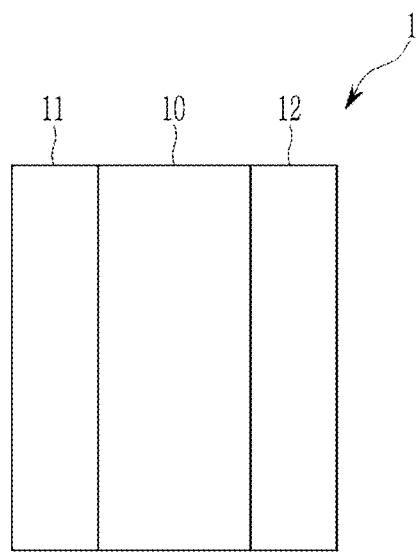
FIG. 6 is a schematic view showing a secondary battery including an electrically conductive hybrid membrane according to an exemplary embodiment.

FIG. 6 is a schematic view showing a secondary battery including an electrically conductive hybrid membrane according to an embodiment.

Referring to FIG. 6, a secondary battery 1 according to an embodiment includes a positive electrode 11, a negative electrode 12, and an electrically conductive hybrid membrane 10 between the positive electrode 11 and the negative electrode 12.

First, a negative electrode 12 is prepared.

The negative electrode 12 may use a lithium metal thin film or may include a current collector and a negative active material layer disposed on the current collector. In an exemplary embodiment, the negative electrode 12 may be used in a state that the lithium metal thin film is disposed on a conductive substrate which is a current collector. The lithium metal thin film may be integrated with the current collector.

In the negative electrode 12, the current collector may be one selected from the group consisting from stainless steel, copper, nickel, iron, and cobalt, but is not necessarily limited thereto and may include any metallic substrate as long as it has good conductivity and being useable in the field pertained to the art. For example, the current collector may be a conductive oxide substrate, a conductive polymer substrate, and the like. In addition, the current collector may have the various structures such as a shape of which a conductive metal, a conductive metal oxide, or a conductive polymer is coated on one surface of the insulating substrate, besides a structure that the entire substrate is made of a conductivity material. The current collector may be a flexible substrate. Thus, the current collector may be easily bent. In addition, after bending this, the current collector may be easily recovered to the original shape.

In addition, the negative electrode 12 may further include other negative active materials in addition to the lithium metal. The negative electrode 12 may include an alloy of lithium metal and other negative active materials, a composite of lithium metal and other negative active materials, or a mixture of lithium metal and other negative active materials.

Other negative active materials that may be added in the negative electrode 12 may be, for example, at least one selected from the group consisting of a metal capable of being alloyed with lithium, transition metal oxide, non-transition metal oxide, and a carbon-based material.

In an exemplary embodiment, the metal capable of being alloyed with lithium may be Si, Sn, Al, Ge, Pb, Bi, Sb, a Si—Y alloy (wherein Y is an element selected from an alkali metal, an alkaline-earth metal, a Group 13 element, a Group 14 element, a transition metal, a rare earth element, or a combination thereof element, and not Si), a Sn—Y alloy (wherein Y is an element selected from an alkali metal, an alkaline-earth metal, a Group 13 element, a Group 14 element, a transition metal, a rare earth element, or a combination thereof, and not Sn), and the like. The element, Y may be Mg, Ca, Sr, Ba, Ra, Sc, Y, Ti, Zr, Hf, Rf, V, Nb, Ta, db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Ti, Ge, P, As, Sb, Bi, S, Se, Te, Po, or a combination thereof.

In an exemplary device, the transition metal oxide may be lithium titanium oxide, vanadium oxide, lithium vanadium oxide, and the like.

In another exemplary device, the non-transition metal oxide may be $SnO_2$, $SiO_x$ ($0<x<2$), and the like.

The carbon-based material may be crystalline carbon, amorphous carbon, or a mixture thereof. The crystalline carbon may be graphite such as amorphous, sheet-shaped, flake shaped, spherical shaped or fiber-shaped natural graphite or artificial graphite, and the amorphous carbon may be soft carbon (carbon fired at low temperature) or hard carbon, mesophase pitch carbonate, fired cokes, and the like.

Alternatively, the negative electrode 12 may include other negative active material instead of lithium metal. The negative electrode 12 may be obtained using a negative active material composition including the negative active material instead of the lithium metal, a conductive agent, a binder, and a solvent.

In an exemplary method, after preparing the negative active material composition, it is directly coated on a current collector to provide a negative electrode plate, or it is casted on a separate support, and the negative active material film detached from the support is laminated on the current collector to provide a negative electrode plate. The negative electrode is not limited to the mentioned shapes but may include any other shapes used in the fields pertaining to the art. In an exemplary method, the negative electrode may be obtained by further printing a negative active material ink including the negative active material, an electrolyte solution, and the like on a current collector according to an inkjet.

The negative active material may be in the form of a powder. The powdery negative active material may be employed for a negative active material composition or a negative active material ink.

The conductive agent may include carbon black, graphite particulate, and the like, but is not limited thereto, and may include any one as long as it is used as a conductive agent in the field pertained to the art.

The binder may include a vinylidene fluoride/hexafluoropropylene copolymer, polyvinylidene fluoride ("PVDF"), polyacrylonitrile, polymethylmethacrylate, polytetrafluoroethylene and a mixture thereof, or a styrene butadiene rubber-based polymer, and the like, but is not limited thereto, and may include any one as long as it is used as a binder in the field pertaining to the art.

The solvent may include N-methylpyrrolidone, acetone or water and the like, but is not limited thereto, and may include any one as long as it is used in the field pertaining to the art.

The amounts of the negative active material, the conductive agent, the binder, and the solvent are as used level for the secondary battery, particularly, the lithium secondary battery. At least one of the conductive agent, the binder, and the solvent may be omitted according to the usage and the structure of the secondary battery.

Next, the positive electrode 11 may be fabricated as follows.

The positive electrode 11 may be obtained in accordance with the same procedure as in the negative active material composition, except that a positive active material is used instead of the negative active material.

In the positive active material composition, a conductive agent, a binder, and a solvent may be the same as in the negative active material composition. The positive active material, the conductive agent, the binder, and the solvent are mixed to provide the positive active material composition. The positive active material composition is directly coated on an aluminum current collector and dried to provide a positive electrode plate formed with a positive active material layer. Alternatively, the positive active material composition is casted on a separate support, and then a film obtained by being detached from the support is laminated on the aluminum current collector to provide a positive electrode plate formed with the positive active material layer.

The positive active material may be a lithium-containing metal oxide and may be any material in the related art without limitation. In an exemplary embodiment, the positive active material may be a composite oxide of a metal selected from cobalt, manganese, nickel, and a combination thereof and lithium and specific examples thereof may be one of compounds represented by $Li_aA_{1-b}B_bD_2$ (wherein, in the chemical formula, $0.90 \leq a \leq 1.8$ and $0 \leq b \leq 0.5$); $Li_aE_{1-b}BbO_{2-c}D_c$ (wherein, in the chemical formula, $0.90 \leq a \leq 1.8$, $0 \leq b \leq 0.5$, $0 \leq c \leq 0.05$); $LiE_{2-b}B_bO_{4-c}D_c$ (wherein, in the chemical formula, $0 \leq b \leq 0.5$, $0 \leq c \leq 0.05$); $Li_aNi_{1-b-c}Co_bB_cD_\alpha$ (wherein, in the chemical formula, $0.90 \leq a \leq 1.8$, $0 \leq b \leq 0.5$, $0 \leq c \leq 0.05$, $0 < \alpha \leq 2$); $Li_aNi_{1-b-c}Co_bB_cO_{2-\alpha}F_\alpha$ (wherein, in the chemical formula, $0.90 \leq a \leq 1.8$, $0 \leq b \leq 0.5$, $0 \leq c \leq 0.05$, $0 < \alpha < 2$); $Li_aNi_{1-b-c}Co_bB_cO_{2-\alpha}F_2$ (wherein, in the chemical formula, $0.90 \leq a \leq 1.8$, $0 \leq b \leq 0.5$, $0 \leq c \leq 0.05$, $0 < \alpha < 2$); $Li_aNi_{1-b-c}Mn_bB_cD_\alpha$ (wherein, in the chemical formula, $0.90 \leq a \leq 1.8$, $0:5 \leq b \leq 0.5$, $0 \leq c \leq 0.05$, $0 < \alpha \leq 2$); $Li_aNi_{1-b-c}Mn_bB_cO_{2-\alpha}F_\alpha$ (wherein, in the chemical formula, $0.90 \leq a \leq 1.8$, $0 \leq b \leq 0.5$, $0 \leq c \leq 0.05$, $0 < \alpha < 2$); $Li_aNi_{1-b-c}Mn_bB_cO_{2-\alpha}F_2$ (wherein, in the chemical formula, $0.90 \leq a \leq 1.8$, $0 \leq b \leq 0.5$, $0 \leq c \leq 0.05$, $0 < \alpha < 2$); $Li_aNi_bE_cG_dO_2$ (wherein, in the chemical formula, $0.90 \leq a \leq 1.8$, $0 \leq b \leq 0.9$, $0 \leq c \leq 0.5$, $0.001 \leq d \leq 0.1$); $Li_aNi_bCo_cMn_dGeO_2$ (wherein, in the chemical formula, $0.90 \leq a \leq 1.8$, $0 \leq b \leq 0.9$, $0 \leq c \leq 0.5$, $0 \leq d \leq 0.5$, $0.001 \leq e \leq 0.1$); $Li_aNiG_bO_2$ (wherein, in the chemical formula, $0.90 \leq a \leq 1.8$, $0.001 \leq b \leq 0.1$); $Li_aCoG_bO_2$ (wherein, in the chemical formula, $0.90 \leq a \leq 1.8$, $0.001 \leq b \leq 0.1$); $Li_aMnG_bO_2$ (wherein, in the chemical formula, $0.90 \leq a \leq 1.8$, $0.001 \leq b \leq 0.1$); $Li_aMn_2GbO_4$ (wherein, in the chemical formula, $0.90 \leq a \leq 1.8$, $0.001 \leq b \leq 0.1$); $QO_2$; $QS_2$; $LiQS_2$; $V_2O_5$; $LiV_2O_5$; $LiIO_2$; $LiNiVO_4$; $Li_{(3-f)}J_2(PO_4)_3$ ($0 \leq f \leq 2$); $Li_{(3-f)}Fe_2(PO_4)_3$ ($0 \leq f \leq 2$); and $LiFePO_4$:

In the above chemical formulae, A is Ni, Co, Mn, or a combination thereof; B is Al, Ni, Co, Mn, Cr, Fe, Mg, Sr, V, a rare earth element, or a combination thereof; D is O, F, S, P, or a combination thereof; E is Co, Mn, or a combination thereof; F is F, S. P, or a combination thereof; G is Al, Cr, Mn, Fe, Mg, La, Ce, Sr, V, or a combination thereof; Q is Ti, Mo, Mn, or a combination thereof; I is Cr, V, Fe, Sc, Y, or a combination thereof; and J is V, Cr, Mn, Co, Ni, Cu, or a combination thereof.

In an exemplary embodiment, the positive active material may be $LiCoO_2$, $LiMn_xO_{2x}$ (x=1, 2), $LiNi_{1-x}Mn_xO_{2x}$ ($0<x<1$), $Ni_{1-x-y}Co_xMn_yO_2$ ($0 \leq x \leq 0.5$, $0 \leq y \leq 0.5$), $LiFePO_4$, and the like.

The compounds may have a coating layer on the surface, or may be mixed with another compound having a coating layer. The coating layer may include at least one coating element compound of an oxide of a coating element, a hydroxide of a coating element, an oxyhydroxide of a coating element, an oxycarbonate of a coating element, or a hydroxyl carbonate of a coating element. The compound for the coating layer may be amorphous or crystalline. The coating element included in the coating layer may include Mg, Al, Co, K, Na, Ca. Si, Ti, V, Sn, Ge, Ga, B, As, Zr, or a mixture thereof. The coating layer may be disposed in a method having no adverse influence on properties of a positive active material by using these elements in the compound. An exemplary method may include any coating method such as spray coating, dipping, and the like, but is not illustrated in more detail since it is well-known in the related field.

The amounts of the positive active material, the conductive agent, the binder, and the solvent are as used level for the secondary battery, particularly, the lithium secondary battery.

Next, the aforementioned electrically conductive hybrid membrane 10 is prepared. The structure of the electrically conductive hybrid membrane 10 is same as in above, and may be interposed between the negative electrode 12 and the positive electrode 11 to block a material except ion and to selectively pass ion.

As described above, the secondary battery 1, according to an embodiment, may be an all-solid-state battery that the aforementioned electrically conductive hybrid membrane 10 is used as a separator and/or a separator-cum-electrolyte. That is, even in the case that the electrically conductive hybrid membrane 10 according to an embodiment is used as a separator for the all-solid-state battery, the secondary battery 1 may have excellent electrochemical characteristics as described above.

In addition, the secondary battery 1, according to an embodiment, has excellent ion conductivity caused by the aforementioned electrically conductive hybrid membrane 10, and also shows improved efficiency and life-span by minimizing the side reaction of the electrode.

Hereinafter, an electronic device including the electrically conductive hybrid membrane according to an embodiment is described.

Figure 7:
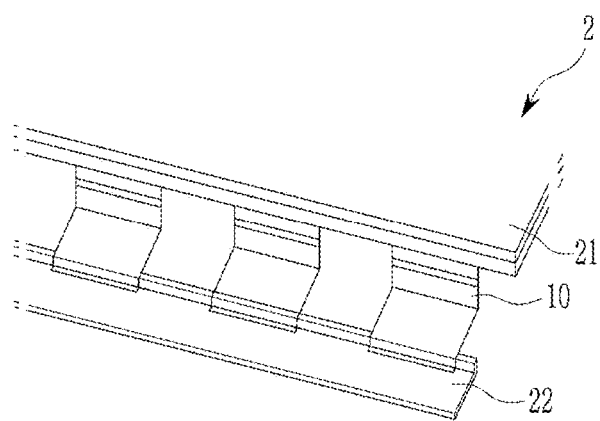
FIG. 7 is a schematic view illustrating an electronic device including an electrically conductive hybrid membrane according to an exemplary embodiment.

FIG. 7 is a schematic view illustrating an electronic device including an electrically conductive hybrid membrane according to an embodiment.

Referring to FIG. 7, the electronic device 2 according to an embodiment physically and electrically connects the display panel 21 to the driver IC 22.

The display panel 21 may at least include an array substrate including a thin film transistor and an opposing substrate configured to oppose the array substrate. When the display panel 21 is a liquid crystal display panel, a liquid crystal layer may be interposed between the array substrate and the opposing substrate. Alternatively, when the display panel 21 is an organic light emitting display panel, an organic light emitting diode may be interposed between the array substrate and the opposing substrate.

The driver IC 22 is connected with a pad formed in a peripheral area of the array substrate and responses a control signal applied through an external device to output a driving signal for driving the array substrate.

As described above, the electronic device 2, according to an embodiment, may be a display device using the electrically conductive hybrid membrane 10 as an anisotropic conductive film. In other words, the electrically conductive hybrid membrane 10 according to an embodiment has excellent electron conductivity, so that it is easily utilized as an anisotropic conductive film electrically connecting constituent elements in the display device.

Hereinafter, the making the electrically conductive hybrid membrane according to an embodiment and properties of the obtained electrically conductive hybrid membrane are illustrated in more detail with reference to examples. However, these examples are exemplary, and the present scope is not limited thereto.

EXAMPLES

Manufacture of Electrically Conductive Hybrid Membrane According to Example 1 and Comparative Examples 1 to 3 and Evaluation of Electron Conductivity Example 1

As conductive particles, electron conductive particles (Sekisui Chemical Co., Ltd., AU-250) having a diameter of about 50 µm (49.5 µm to 50.5 µm) in which a nickel layer and a gold layer are sequentially formed (thickness of nickel layer+thickness of gold layer=0.22 µm) on a surface of an elastomer core including an epoxy-based compound and a phenol-based compound are used. A membrane substrate-forming layer is prepared by mixing a curable material of an acryl-based adhesive including a diisocyanate group (Tosoh Corporation, Coronate L45E) and a photopolymerization initiator of 1-hydroxy-cyclohexyl-phenyl-ketone (BASF, Irgacure 184). A releasing film (silicon-treated PET film) is coated on each of the upper/lower sides of the membrane substrate-forming layer. The membrane substrate-forming layer has an initial thickness of 15 µm.

Subsequently, the release film covering the upper side of the membrane substrate-forming layer is peeled off, and then the electron conductive particles are scattered on the upper side of the membrane substrate-forming layer in an area of 20 mm×20 mm. After the scattering, the peeled release film is coated on the upper side of the membrane substrate-forming layer again.

Then the adhesion film on which particles are scattered is disposed between two aluminum plates having a thickness of 4 mm, and heated and pressed under the conditions of 60 MPa and 150° C. for 3 minutes using a hydraulic heating press (Carver). Subsequently, the heated and pressed samples are taken out and cooled down to a room temperature (25° C.), and irradiated with ultraviolet (UV) by a UV radiator (Heraeus, Fusion UV Light Hammer) (radiation dose: 2000 mJ/cm$^2$) to cure a membrane substrate-forming layer.

Then the release films covering the upper/lower sides of the sample are peeled off to provide an electrically conductive hybrid membrane according to Example 1.

Comparative Example 1

An electrically conductive hybrid membrane according to Comparative Example 1 is manufactured in accordance with the same procedure as in Example 1, except that the initial thickness of the membrane substrate-forming layer is changed to 50 µm.

Comparative Example 2

An electrically conductive hybrid membrane according to Comparative Example 2 is manufactured in accordance with the same procedure as in Example 1, except that the initial thickness of the membrane substrate-forming layer is changed to 30 µm.

Comparative Example 3

An electrically conductive hybrid membrane according to Comparative Example 3 is manufactured in accordance with the same procedure as in Example 1, except that the conductive particles are not coated.

The central regions of the electrically conductive hybrid membranes obtained from Example 1 and Comparative Examples 1 to 3 are each cut into 10 mm×10 mm and then are measured for an electrical resistance (mega ohm, MΩ) of the sample using the ohm meter.

Each specification of Example 1 and Comparative Examples 1 to 3 and the resistance results thereof are shown in Table 1.

TABLE 1

|  |  |  | Example 1 | Comparative Example 1 | Comparative Example 2 | Comparative Example 3 |
|---|---|---|---|---|---|---|
| Electrically conductive particle | Material |  | Elastomer core/nickel layer/gold layer | Elastomer core/nickel layer/gold layer | Elastomer core/nickel layer/gold layer | Not include |
|  | Diameter [D] |  | 50 (μm) | 50 (μm) | 50 (μm) | — |
| Initial thickness of membrane substrate-forming layer [t] |  |  | 15 (μm) | 50 (μm) | 30 (μm) | 15 (μm) |
| [t]/[D] |  |  | 0.3 | 1.0 | 0.6 | ∞ |
| Elastic modulus of membrane substrate-forming layer | Before UV irradiation | Room temperature Heating | 150 (kPa) 5 (kPa) | 150 (kPa) 5 (kPa) | 150 (kPa) 5 (kPa) | 150 (kPa) 5 (kPa) |
|  | After UV irradiation | Room temperature | 70 (MPa) | 70 (MPa) | 70 (MPa) | 70 (MPa) |
| Evaluation Result | Electrical Resistance |  | 0.78 (Ω) | unmeasurable | unmeasurable | unmeasurable |

Referring to Table 1, Example 1, which satisfies Equation 1 representing the relationship between the initial thickness t of the membrane substrate-forming layer and a diameter D of the electrically conductive particles, shows electrical conductivity, but Comparative Examples 1 to 3 are unmeasurable for the electrical conductivity.

Specifically, as Comparative Example 3 does not include the conductive particles, itself, it does not show electrical conductivity; and as Comparative Examples 1 and 2 have the relationship of t/d of greater than 0.4, the conductive particles are not exposed on both sides of the solid membrane substrate.

Also, considering that the electrical resistance of the aluminum foil having a thickness of 30 μm is 0.37Ω, it is understood that the electrically conductive hybrid membrane according to Example 1 shows the excellent electrical conductivity similar to the aluminum foil.

Manufacture of Electrically Conductive Hybrid Membrane according to Examples 2 to 3 and Comparative Examples 4 to 5 and Evaluation of Ion Conductivity Example 2

An electrically conductive hybrid membrane according to Example 2 is manufactured in accordance with the same procedure as in Example 1, except that for the conductive particles, LATP particles having a diameter of about 33 μm (28 μm to 33 μm) are filtered by a sieve, and the initial thickness of the membrane substrate-forming layer is changed to 15 μm, the pressing and heating conditions are changed into 60 MPa, 130° C., and 3 minutes, and the ultraviolet (UV) radiation dose is changed to 500 mJ/cm².

Example 3

An electrically conductive hybrid membrane according to Example 3 is manufactured in accordance with the same procedure as in Example 2, except that a thermosetting acryl-based adhesive (TOAGOSEI, Aronix UVP-1211) which is heating cross-linkable at a temperature of 100° C. or higher according to a photodimerization of maleimide is used as a material for forming a membrane substrate-forming layer (initial thickness: 15 μm), and the irradiating ultraviolet (UV) is omitted.

Comparative Example 4

An electrically conductive hybrid membrane according to Comparative Example 4 is manufactured in accordance with the same procedure as in Example 2, except that a thermoplastic resin of polyvinylidene chloride ("PVDC," Asahi Kasei, Saran Wrap) (initial thickness: 10 μm) is used as a material for forming a membrane substrate-forming layer and heated at 150° C. for 3 minutes without pressing the same.

Comparative Example 5

The LATP particles disclosed in Example 2 are scattered on a water-soluble adhesive tape, and then a cycloolefin polymer (COP) (Japan Zeon, ZEONOR 1060R)-containing solution is coated thereon and dried at 90° C. for 20 minutes, which are repeated for 5 times forming a membrane substrate-forming layer. The initial thickness of the membrane substrate-forming layer was 10 μm. Subsequently, the surface of the membrane is etched with an etching solution, and the LATP particles are exposed on both sides of the cycloolefin polymer film, and then water-soluble adhesive tape is peeled off to provide an electrically conductive hybrid membrane according to Comparative Example 5.

The upper sides and the lower sides of the electrically conductive hybrid membranes according to Examples 2 to 3 and Comparative Examples 4 to 5 are each taken an image by SEM, and it is monitored whether voids are generated.

Also, during the process of making the electrically conductive hybrid membrane, the peel strength of the membrane substrate-forming layer and the release film after scattering particles is measured under the conditions of 25° C., 180° C., and 300 mm/minute.

Also, for the electrically conductive hybrid membrane, a Warburg impedance is measured according to an AC impedance method to evaluate a lithium ion conductivity.

Table 2 show the summary of specifications of Examples 2 and 3 and Comparative Examples 4 and 5, the void generation in the membrane substrate, the peel strength of the membrane substrate-forming layer, and the lithium ion conductivity.

TABLE 2

|  | Example 2 | Example 3 | Comparative Example 4 | Comparative Example 5 |
|---|---|---|---|---|
| Conductive Material particle Diameter | LATP 33 (μm) | LATP 33 (μm) | LATP 33 (μm) | LATP 33 (μm) |
| Material of membrane substrate-forming layer | Acryl-based compound | Acryl-based compound | PVDC | COP |
| Material characteristics | ultraviolet (UV) curable | thermosetting | thermoplastic | thermoplastic |
| Processing manner | pressing, heating | heating, heating | heating, heating | coating and etching |
| Peel strength (upon scattering particles) | 20 (N/25 mm) | 5 (N/25 mm) | 0.01 (N/25 mm) | 10 (N/25 mm) or less |
| Elastic modulus Before processing | 150 (kPa) | 90 (kPa) | 2 (GPa) | 3 (GPa) |
| After processing | 70 (MPa) | 80 (MPa) | 2 (GPa) | 3 (GPa) |
| Void generation | No | No | Yes | No |
| Lithium ion conductivity | ○ | ○ | X (short circuit) | ○ |

Referring to Table 2, it is confirmed that Examples 2 and 3 having the membrane substrate-forming layer using the curable material show excellent lithium ion conductivity and do not show the void generation, compared to Comparative Examples 4 and 5 having the membrane substrate-forming layer using the thermoplastic material. Thereby, it is confirmed that Examples 2 and 3 show higher stability and mass producibility than in Comparative Examples 4 and 5.

Figure 8:
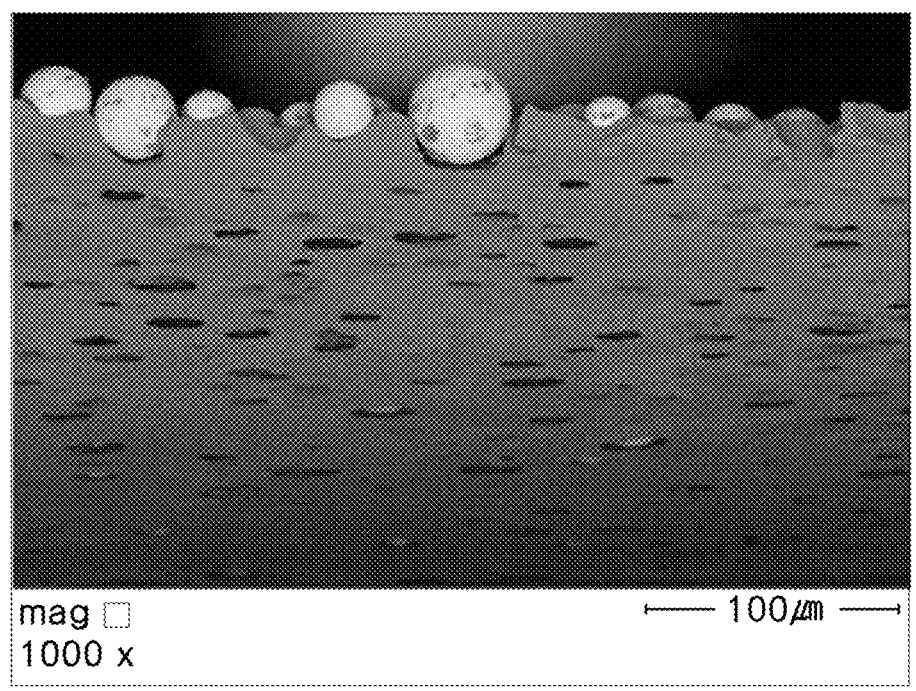
FIG. 8 is a scanning electron microscope ("SEM") image showing the lower surface of the electrically conductive hybrid membrane according to Comparative Example 4.

FIG. 8 is a SEM image showing the lower surface of the electrically conductive hybrid membrane according to Comparative Example 4.

Referring to FIG. 8, when the membrane substrate-forming layer is formed using the thermoplastic resin as in Comparative Example 4, the conductive particles are inappropriately inserted into the membrane substrate-forming composition due to the excessively high elastic modulus, so that the conductive particles are not properly exposed onto the lower surface, and also lots of the voids are generated on the lower surface as shown in FIG. 8.

Manufacture of Electrically Conductive Hybrid Membrane According to Examples 4 to 7 and Comparative Examples 6 to 8 and Evaluation of Related Properties Example 4

An electrically conductive hybrid membrane according to Example 4 is manufactured in accordance with the same procedure as in Example 1, except that the initial thickness of the membrane substrate-forming layer is changed to 15 μm, and the pressing and heating conditions are changed to 60 MPa, 130° C., and 3 minutes, and the ultraviolet (UV) dose is changed to 500 mJ/cm².

Example 5

An electrically conductive hybrid membrane according to Example 5 is manufactured in accordance with the same procedure as in Example 1, except that one-component curable epoxy adhesion (thermosetting, manufactured by Cemedine, EP138) (initial thickness: 15 μm) is used as a material for forming a membrane substrate, and the irradiating ultraviolet (UV) is omitted.

Example 6

A moisture curable one-component adhesion (Cemedine, UM700) including a main component of a prepolymer having a terminal NCO group as a material for forming a membrane substrate is coated on a release film in a thickness of about 10 μm according to a blade coating method. The electrically conductive particles which are used in Example 1 are scattered onto a 20 mm×20 mm area of the coated adhesion, and then pressed without heating at 60 MPa, 23° C., for 120 minutes using a hydraulic heating press used in Example 1. Then the release film coated on the particle-scattered surface is peeled off and allowed to stand for 60 minutes to absorb moisture, and then the reminded release film is also peeled off and allowed to stand for 60 minutes to absorb moisture, so as to provide an electrically conductive hybrid membrane according to Example 6.

Example 7

As a material for a membrane substrate-forming layer, a modified phenol-based adhesion (thermosetting, manufactured by Cemedine, Cemedine 110) is coated as a wet film on a release film in a thickness of about 20 μm and naturally dried at 23° C. for 3 hours to provide a membrane substrate-forming layer having a film thickness of 10 μm. Then the electrically conductive particles used in Example 1 are scattered onto a 20 mm×20 mm area of the coated adhesion, and the release film is coated on the scattered surface and heated and pressed at 60 MPa, at 180° C. for 30 minutes using the hydraulic heating press which is used in Example 1, and the release films are peeled off to provide an electrically conductive hybrid membrane according to Example 7.

Comparative Example 6

An electrically conductive hybrid membrane according to Comparative Example 6 is manufactured in accordance with the same procedure as in Example 1, except that the thermoplastic resin of PVDC which is used in Comparative Example 4 as a material for a membrane substrate-forming layer is used, and the irradiating ultraviolet (UV) is omitted.

Comparative Example 7

An electrically conductive hybrid membrane according to Comparative Example 7 is manufactured in accordance with the same procedure as in Example 1, except that the thermoplastic resin of COP which is used in Comparative Example 5 as a material for a membrane substrate-forming layer is used, the pressing and heating conditions are changed into 60 MPa, 260° C. for 5 minutes, and the irradiating ultraviolet (UV) is omitted.

Comparative Example 8

An electrically conductive hybrid membrane according to Comparative Example 8 is manufactured in accordance with the same procedure as in Example 1, except that the polypropylene (TORAY, TORAYFAN, 2500H, 30 μm) (initial thickness: 30 μm) is used as a material for a membrane substrate-forming layer, the pressing and heating conditions are changed into 60 MPa, 170° C. for 5 minutes, and the irradiating ultraviolet (UV) is omitted The electrically conductive hybrid membranes according to Examples 4 10 to 7 and Comparative Examples 6 to 8 are measured for the void generation in the membrane substrate, the peel strength of the membrane substrate-forming layer, and the electrical resistance according to the same procedure as in above.

In addition, the SEM images are measured for the upper/lower sides of the electrically conductive hybrid membrane, and observed whether the electrically conductive particles are exposed on the both surfaces of the solid membrane substrate.

Additionally, the electrically conductive hybrid membrane is performed with the flexibility evaluation using a cylindrical mandrel method according to JIS.K. 5600-5-1. Specifically, the bend test is performed using a mandrel having a diameter of 5 mm, which is repeated for 10 times, and it is determined whether cracks and/or damages occur on the surface of the bend test-completed conductive hybrid membrane.

In this case, "○" indicates a case that the cracks and/or damages are not found on the surface of the conductive hybrid membrane; and "X" indicates a case that the cracks and/or damages occur or a case that the bend testis impossible to perform.

Every specification and every property measurement result of Examples 4 to 7 and Comparative Examples 6 to 8 are summarized and shown in Table 3.

TABLE 3

|  | Ex. 4 | Ex. 5 | Ex. 6 | Ex. 7 | Comp. Ex. 6 | Comp. Ex. 7 | Comp. Ex. 8 |
| --- | --- | --- | --- | --- | --- | --- | --- |
| Material of membrane substrate-forming layer | Acryl-based compound | Epoxy-based compound | Urethane-based compound | Phenol-based compound | PVDC | COP | PP |
| Material characteristic | UV curable | Thermosetting | Moisture curable | Thermosetting | Thermoplastic | Thermoplastic | Thermoplastic |
| Processing manner | heating, pressing | heating, pressing | room temperature, pressing | heating, pressing | heating, pressing | heating, pressing | heating, pressing |
| Peel strength (upon scattering particles) | 20 (N/25 mm) | 75 (N/25 mm) | 5 (N/25 mm) | 50 (N/25 mm) | less than 0.01 (N/25 mm) | less than 0.01 (N/25 mm) | less than 0.01 (N/25 mm) |
| Void | No | No | No | No | Yes | Yes | Yes |
| Particle exposure | Exposed on both sides | Exposed on both sides | Exposed on both sides | Exposed on both sides | Exposed on one side | Exposed on one side | Exposed on one side |
| Flexibility | ○ | ○ | ○ | ○ | ○ | X (unbendable) | X (stripes generation) |
| Electrical resistance | 0.80(Ω) | 1.50(Ω) | 2.00(Ω) | 2.50(Ω) | Unmeasurable | unmeasurable | unmeasurable |

Referring to Table 3, Examples using the curable material have higher peel strength of the membrane substrate-forming layer and are more flexible than in Comparative Examples using the thermoplastic material, and as the electrically conductive particles are exposed on both sides of the solid membrane substrate to provide an electrical conductivity (electron conductivity).

In Comparative Examples, it is confirmed that the peel strength of the membrane substrate-forming layer is also low, a plurality of voids occur on the surface of the membrane substrate, and the electrical conductivity is also not shown as the conductive particles are not exposed on both sides of the membrane substrate.

Manufacture of Electrically Conductive Hybrid Membrane According to Examples 8 to 12 and Comparative Examples 9 to 13 and Evaluation of Properties Example 8

An electrically conductive hybrid membrane according to Example 8 is manufactured in accordance with the same procedure as in Example 1, except that the LATP particles, which are used in Example 2, are used as the conductive particles, the acryl-based adhesive, which is used in Example 1, is used as the material for forming the membrane-forming layer (initial thickness: 8 μm), and the pressing and heating conditions and the ultraviolet (UV) dose are changed.

Example 9

An electrically conductive hybrid membrane according to Example 9 is manufactured in accordance with the same procedure as in Example 1, except that $ZrO_2$ particles having a diameter of about 50 μm are used as the conductive particle, and the pressing and heating conditions are changed.

Example 10

An electrically conductive hybrid membrane according to Example 10 is manufactured in accordance with the same procedure as in Example 1, except that the pressing and heating conditions and the ultraviolet (UV) irradiating dose are changed.

Example 11

An electrically conductive hybrid membrane according to Example 11 is manufactured in accordance with the same procedure as in Example 1, except that an acryl-based adhesive having a weight of the diisocyanate group in 1.3 times with respect to the acryl-based adhesive used in Example 1, and the pressing and heating conditions and the ultraviolet (UV) irradiating dose are changed.

Example 12

An electrically conductive hybrid membrane according to Example 12 is manufactured in accordance with the same procedure as in Example 1, except that an acryl-based adhesive, which is used in Example 3, is used as the material for the membrane-forming layer, and the pressing and heating conditions are changed.

Comparative Example 9

An electrically conductive hybrid membrane according to Comparative Example 9 is manufactured in accordance with the same procedure as in Example 9, except that the pressing and heating conditions are changed.

Comparative Example 10

An electrically conductive hybrid membrane according to Comparative Example 10 is manufactured in accordance with the same procedure as in Example 8, except that the acryl-based adhesive, which is used in Example 3, is used as a material for a membrane-forming layer, and the pressing and heating conditions and the ultraviolet (UV) irradiating dose are changed.

Comparative Example 11

An electrically conductive hybrid membrane according to Comparative Example 11 is manufactured in accordance with the same procedure as in Example 8, except that the pressing and heating conditions are changed, and the irradiating ultraviolet (UV) is omitted.

Comparative Example 12

An electrically conductive hybrid membrane according to Comparative Example 12 is manufactured in accordance with the same procedure as in Example 10, except that the material for the membrane-forming layer, the pressing and heating conditions, and the ultraviolet (UV) radiation dose are changed.

As a material for forming a membrane-forming layer, an acryl-based adhesive of which a weight-based cross-linking density of the polymer main chain is 0.7 times with respect to the acryl-based adhesive which is used in Example 1, and a maleimide weight is 1.3 times with respect to the acryl-base adhesive which is used in Example 3, the cross-linking property is higher after the UV curing than the acryl-based adhesive which is used in Example 3 while the cross-linking density is low before the UV curing.

Comparative Example 13

An electrically conductive hybrid membrane according to Comparative Example 13 is manufactured in accordance with the same procedure as in Example 12, except that the pressing and heating conditions and the ultraviolet (UV) irradiating dose are changed.

For Examples 8 to 12 and Comparative Examples 9 to 13, the exposure of the conductive particles, the flexibility, and the electrical resistance, and the peel strength before pressing and heating the membrane-substrate forming layer are evaluated in accordance with the same procedure as in the above.

Every specification of Examples 8 to 12 and Comparative Examples 9 to 13 and the property results are summarized and shown in Table 4.

TABLE 4

| | | | Ex. 8 | Ex. 9 | Ex. 10 | Ex. 11 | Ex. 12 |
|---|---|---|---|---|---|---|---|
| Initial thickness of membrane forming layer [t] | | | 8 (μm) | 15 (μm) | 15 (μm) | 15 (μm) | 15 (μm) |
| Electrically conductive particles | Material | | LATP | $ZrO_2$ | elastomer core/nickel layer/gold layer | elastomer core/nickel layer/gold layer | elastomer core/nickel layer/gold layer |
| | Diameter [D] | | 33 (μm) | 50 (μm) | 50 (μm) | 50 (μm) | 50 (μm) |
| [t]/[D] | | | 0.24 | 0.30 | 0.30 | 0.30 | 0.30 |
| Peel strength (before heating) | | | 20 (N/25 mm) | 5 (N/25 mm) | 20 (N/25 mm) | 75 (N/25 mm) | 10 (N/25 mm) |
| Heating, pressing | Pressure | | 60 (MPa) | 60 (MPa) | 60 (MPa) | 60 (MPa) | 60 (MPa) |
| | Time | | 3 (minutes) | 3 (minutes) | 3 (minutes) | 3 (minutes) | 3 (minutes) |
| | Temperature | | 102-108 (° C.) | 150-154 (° C.) | 102-108 (° C.) | 150-154 (° C.) | 100-110 (° C.) |
| Ultraviolet (UV) radiation dose | | | 500 ($mJ/cm^2$) | 2000 ($mJ/cm^2$) | 500 ($mJ/cm^2$) | 500 ($mJ/cm^2$) | 2000 ($mJ/cm^2$) |
| Elastic modulus | Before UV irradiation | Room temperature | 90 (kPa) | 150 (kPa) | 90 (kPa) | 300 (kPa) | 400 (kPa) |
| | | Upon pressing | 70 (kPa) | 1 (kPa) | 70 (kPa) | 50 (kPa) | 12 (kPa) |

TABLE 4-continued

|  |  | | | | | |
|---|---|---|---|---|---|---|
| After curing (room temperature) | | 100 (MPa) | 70 (MPa) | 100 (MPa) | 120 (MPa) | 700 (MPa) |
| Particle exposure | | Exposed on both sides | Exposed on both sides | Exposed on both sides | Exposed on both sides | Exposed on both sides |
| Membrane status | | ○ | ○ | ○ | ○ | ○ |
| Electrical resistance | | — | — | 0.80 (Ω) | 1.50 (Ω) | 2.00 (Ω) |

|  |  |  | Comp. Ex. 9 | Comp. Ex. 10 | Comp. Ex. 11 | Comp. Ex. 12 | Comp. Ex. 13 |
|---|---|---|---|---|---|---|---|
| Initial thickness of membrane forming layer [t] | | | 15 (μm) | 8 (μm) | 8 (μm) | 15 (μm) | 15 (μm) |
| Electrically conductive particles | Material | | $ZrO_2$ | LATP | LATP | elastomer core/nickel layer/gold layer | elastomer core/nickel layer/gold layer |
|  | Diameter [D] | | 50 (μm) | 33 (μm) | 33 (μm) | 50 (μm) | 50 (μm) |
| [t]/[D] | | | 0.30 | 0.24 | 0.24 | 0.30 | 0.30 |
| Peel strength (before heating) | | | 5 (N/25 mm) | 5 (N/25 mm) | 20 (N/25 mm) | 20 (N/25 mm) | 5 (N/25 mm) |
| Heating, pressing | Pressure | | 60 (MPa) | 60 (MPa) | 60 (MPa) | 60 (MPa) | 60 (MPa) |
|  | Time | | 3 (minutes) | 3 (minutes) | 3 (minutes) | 3 (minutes) | 3 (minutes) |
|  | Temperature | | 25 (° C.) | 50-60 (° C.) | 50-60 (° C.) | 25 (° C.) | 50-60 (° C.) |
| Ultraviolet (UV) radiation dose | | | 2000 (mJ/cm²) | 2000 (mJ/cm²) | — | 2000 (mJ/cm²) | 2000 (mJ/cm²) |
| Elastic modulus | Before UV irradiation | Room temperature | 150 (kPa) | 500 (kPa) | 90 (kPa) | 150 (kPa) | 90 (kPa) |
|  |  | Upon pressing | 150 (kPa) | 30 (kPa) | 70 (kPa) | 150 (kPa) | 70 (kPa) |
|  | After curing (room temperature) | | 70 (MPa) | 5000 (MPa) | 0.07 (MPa) | 70 (MPa) | 5000 (MPa) |
| Particle exposure | | | Exposed on both sides | Exposed on both sides | Exposed on both sides | Exposed on one side | Exposed on both sides |
| Membrane status | | | ○ | X (crack generation) | X (insufficient membrane strength) | ○ | X (crack generation) |
| Electrical resistance | | | — | — | — | unmeasurable (overload) | unmeasurable |

Referring to Table 4, it is confirmed that in Examples in which the material for forming a membrane-forming layer is controlled to have an elastic modulus of less than or equal to about 100 kPa during the pressing and heating process, the conductive particles are easily exposed on the both sides of the solid membrane substrate, and the excellent electron conductivity (in cases of Examples 10 to 12) is shown, and the excellent elastic modulus is shown at a room temperature (25° C.), even after the curing. In addition, it is confirmed that the results are obtained by using either an electron conductive particle or an ion conductive particle as the as the conductive particle.

Manufacture of Electrically Conductive Hybrid Membrane According to Example 13 and Comparative Example 14 and Evaluation of Surface Characteristics and Electric Characteristics Example 13

An electrically conductive hybrid membrane according to Example 13 is manufactured in accordance with the same procedure as in Example 1, except that a curable acryl-based adhesive (TOAGOSEI, Aronix UVP-1301) is used as a material for a membrane-forming layer, and the pressing and heating conditions and the ultraviolet (UV) radiation dose are changed.

Comparative Example 14

An electrically conductive hybrid membrane according to Comparative Example 14 is manufactured in accordance with the same procedure as in Example 13, except that the pressing and heating conditions are changed.

The upper side and the lower side of the electrically conductive hybrid membrane according to Example 13 and Comparative Example 14 are each observed by SEM, and the results are shown in FIGS. 9 to 12.

In addition, the electrical resistance of each electrically conductive hybrid membranes according to Example 13 and Comparative Example 14 is evaluated in accordance with the same procedure as in above.

Every specification of Example 13 and Comparative Example 14, and the property results are summarized and shown in Table 5.

TABLE 5

|  | Example 13 | Comparative Example 14 |
|---|---|---|
| Electrically conductive particle | Elastomer core/nickel layer/gold layer | Elastomer core/nickel layer/gold layer |
| Membrane-forming layer material | Acryl-based compound | Acryl-based compound |
| Membrane-forming layer material initial thickness | 15 (μm) | 15 (μm) |
| Heating, pressing Pressure | 60 (MPa) | 0 (MPa) |
| Time | 5 (min) | 5 (min) |
| Temperature | 136-141 (° C.) | 134-146 (° C.) |
| Electrical resistance | 0.78(Ω) | 2.37(Ω) |

Figure 9:
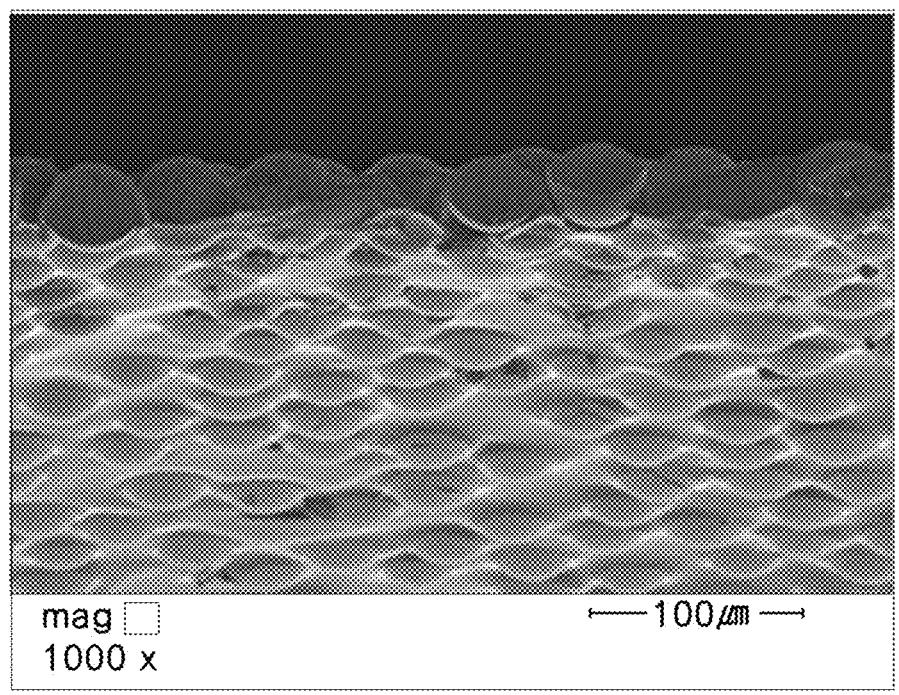
FIGS. 9 and 10 are SEM images showing the upper surface (FIG. 9) and the lower surface (FIG. 10) of the electrically conductive hybrid membrane according to Example 13.
Figure 10:
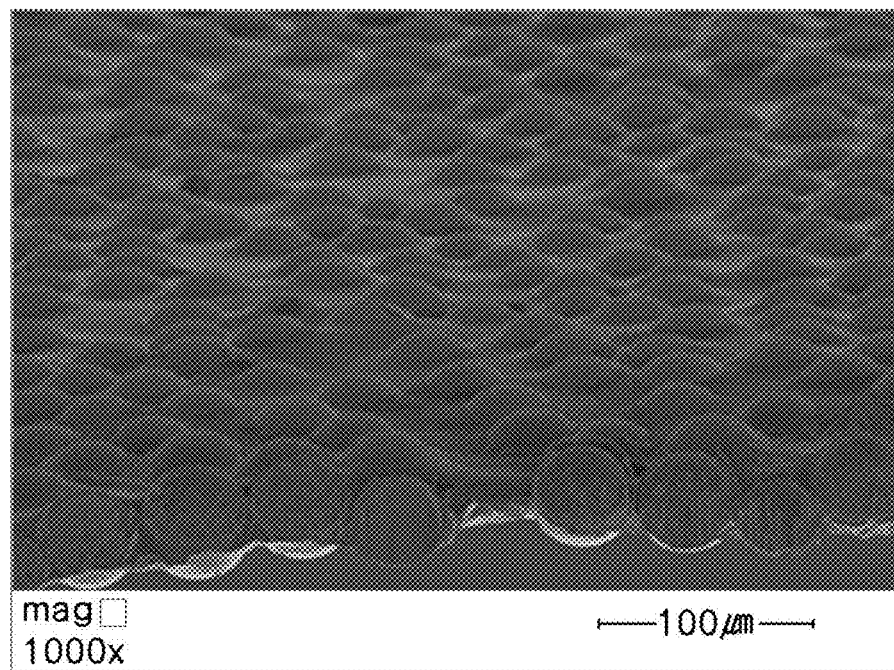
Figure 11:
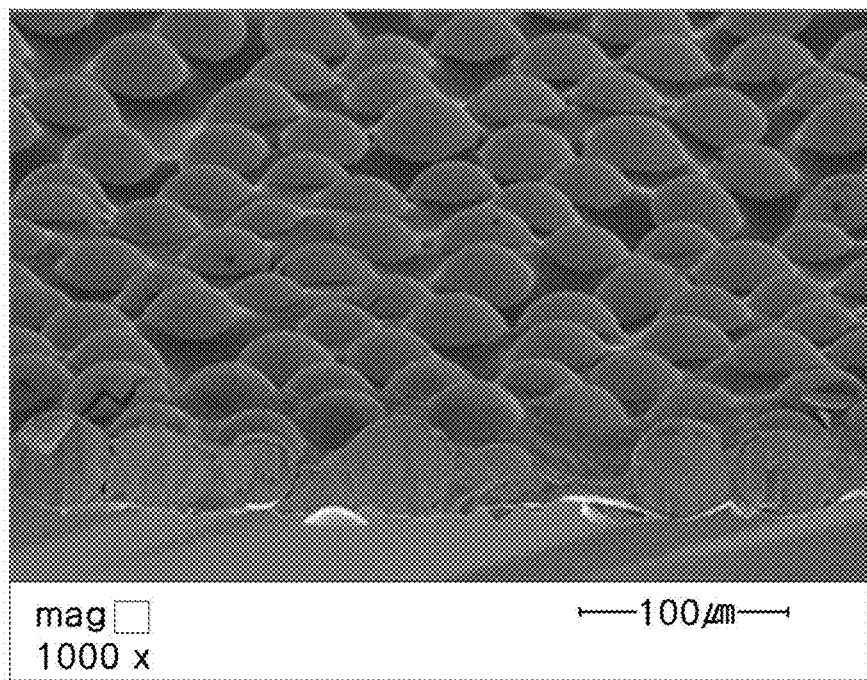
FIGS. 11 and 12 are SEM images showing the upper surface (FIG. 11) and the lower surface (FIG. 12) of the electrically conductive hybrid membrane according to Comparative Example 14.
Figure 12:
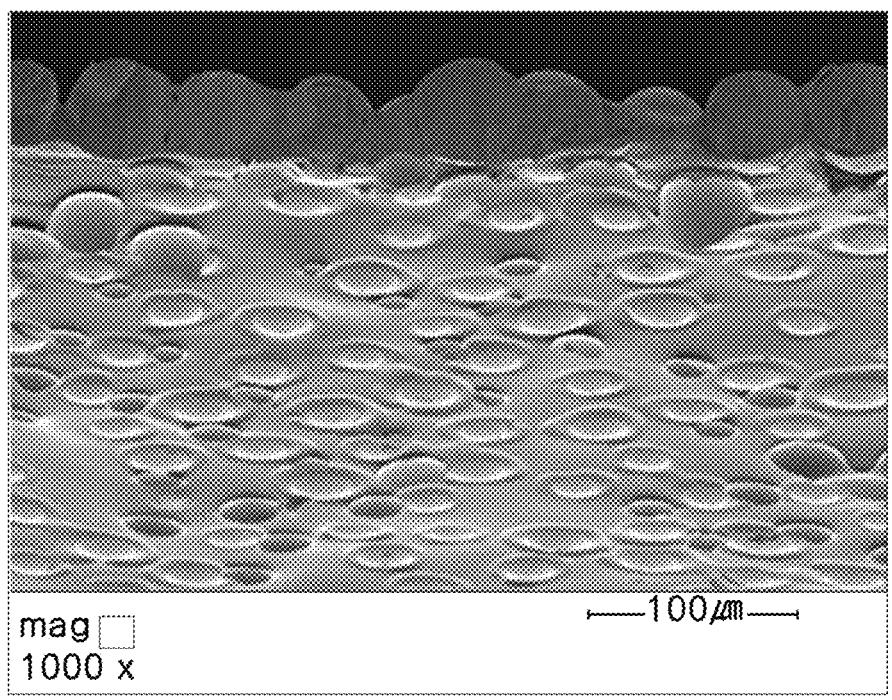

FIGS. 9 and 10 are SEM images showing the upper side (FIG. 9) and the lower side (FIG. 10) of the electrically conductive hybrid membrane according to Example 13; and FIGS. 11 and 12 are SEM images showing the upper side (FIG. 11) and the lower side (FIG. 12) of the electrically conductive hybrid membrane according to Comparative Example 14.

Referring to Table 5 and FIGS. 9 to 12, it is also confirmed that the electrically conductive hybrid membrane according to Example 13 shows the excellent electrical conductivity, and also the electrically conductive particles are regularly exposed on both upper and lower sides, and the electrically conductive particles form a predetermined dense arrangement In Example 13, it is understood that the electrically conductive particles on the upper side are more protruded than on the lower side in Comparative Example 14, and also a ratio of the electrically conductive particles exposed on the lower side is lower than in other Examples. Thereby, it is confirmed that Example 13 shows lower resistance than Comparative Example 14.

Accordingly, from Experimental Examples, it is confirmed that the electrically conductive hybrid membrane according to an embodiment shows excellent electrical conductivity and excellent mechanical strength, excellent flexibility, and excellent barrier properties or the like.

While this disclosure has been described in connection with what is presently considered to be practical example embodiments, it is to be understood that the invention is not limited to the disclosed embodiments. On the contrary, it is intended to cover various modifications and equivalent arrangements included within the spirit and scope of the appended claims.

What is claimed is:

1. A hybrid membrane, comprising:
a solid membrane substrate comprising a cured product of an adhesive material; and
a conductive particle comprising an ion conductive particle, an electron conductive particle, or a combination thereof, the conductive particle being exposed from both opposing surfaces of the solid membrane substrate,
wherein a thickness t of the solid membrane substrate and a diameter D of the conductive particle satisfy the relationship of Equation 1:

$$t \leq 0.4 \times D, \text{ and} \qquad \text{Equation 1}$$

wherein a peel strength of a membrane substrate-forming layer during disposing of the conductive particles is 0.05 Newton per 25 millimeters to 100 Newtons per 25 millimeters, wherein the solid membrane substrate is derived from the membrane substrate-forming layer.

2. The hybrid membrane of claim 1, wherein the solid membrane substrate is an insulating substrate.

3. The hybrid membrane of claim 1, wherein a resistivity of the solid membrane substrate is 10 ohm-meters to $10^{25}$ ohm-meters.

4. The hybrid membrane of claim 1, wherein an elastic modulus of the solid membrane substrate is 10 megaPascals to 1000 megaPascals at room temperature.

5. The hybrid membrane of claim 1, wherein the adhesive material comprises a thermosetting adhesive material, an ultraviolet (UV) curable adhesive material, a moisture curable adhesive material, or a combination thereof.

6. The hybrid membrane of claim 1, wherein the adhesive material comprises an acryl adhesive, an epoxy adhesive, a urethane adhesive, a phenol adhesive, or a combination thereof.

7. The hybrid membrane of claim 1, wherein a tackiness of the adhesive material is 1 Newton per square centimeter to 20 Newtons per square centimeter.

8. The hybrid membrane of claim 1, wherein the conductive particles are arranged in hexagonal shape.

9. The hybrid membrane of claim 1, wherein the ion conductive particle conducts at least one ion of a lithium ion, a sodium ion, a proton, an iron ion, a zinc ion, a magnesium ion, and a potassium ion.

10. The hybrid membrane of claim 1, wherein an ion conductivity of the ion conductive particle is $1 \times 10^{-5}$ Siemens per centimeter to $1 \times 10^{-3}$ Siemens per centimeter.

11. The hybrid membrane of claim 1, wherein the electron conductive particle comprises an elastomer and a metal layer disposed on the surface of the elastomer.

12. The hybrid membrane of claim 11, wherein the elastomer comprises a polystyrene compound, an epoxy compound, a polyimide compound, a phenol compound, or a combination thereof, and
the metal layer comprises gold (Au), silver (Ag), nickel (Ni), palladium (Pd), copper (Cu), or a combination thereof.

13. The hybrid membrane of claim 1, wherein the thickness t of the solid membrane substrate and the diameter D of the conductive particle satisfy the relationship: $0.24 \times D \leq t \leq 0.30 \times D$.

14. An electronic device comprising the hybrid membrane of claim 1.

15. A secondary battery comprising
a positive electrode;
a negative electrode; and
a hybrid membrane disposed between the positive electrode and the negative electrode,
wherein the hybrid membrane comprises
a solid membrane substrate comprising a cured product of an adhesive material; and
an ionic conductive particle, the ionic conductive particle being exposed from both opposing surfaces of the solid membrane substrate, and
wherein a thickness t of the solid membrane substrate and a diameter D of the ionic conductive particle satisfy the relationship of Equation 1:

$$t \leq 0.4 \times D, \qquad \text{Equation 1}$$

wherein a peel strength of a membrane substrate-forming layer during disposing of the conductive particles is 0.05 Newton per 25 millimeters to 100 Newtons per 25 millimeters, wherein the solid membrane substrate is derived from the membrane substrate-forming layer.

16. The secondary battery of claim 15, wherein an elastic modulus of the solid membrane substrate is 10 megaPascals to 1000 megaPascals at room temperature.

17. An anisotropic conductive film comprising
a solid membrane substrate comprising a cured product of an adhesive material; and
an electron conductive particle, the electron conductive particle being exposed from both opposing surfaces of the solid membrane substrate,
wherein a thickness t of the solid membrane substrate and a diameter D of the electron conductive particle satisfy the relationship of Equation 1:

$$t \leq 0.4 \times D, \text{ and} \qquad \text{Equation 1}$$

wherein a peel strength of a membrane substrate-forming layer during disposing of the conductive particles is 0.05 Newton per 25 millimeters to 100 Newtons per 25 millimeters, wherein the solid membrane substrate is derived from the membrane substrate-forming layer.

18. An electronic device comprising the anisotropic conductive film of claim 17.

19. The anisotropic conductive film of claim 17, wherein an elastic modulus of the solid membrane substrate is 10 megaPascals to 1000 megaPascals at room temperature.

* * * * *